(12) United States Patent
Ahn et al.

(10) Patent No.: US 8,189,162 B2
(45) Date of Patent: May 29, 2012

(54) LIQUID CRYSTAL DISPLAY DEVICE AND FABRICATING METHOD THEREOF

(75) Inventors: Byung Chul Ahn, Anyang-si (KR); Byoung Ho Lim, Gumi-si (KR); Jae Jun Ahn, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/789,067

(22) Filed: May 27, 2010

(65) Prior Publication Data

US 2010/0237349 A1    Sep. 23, 2010

Related U.S. Application Data

(62) Division of application No. 11/169,571, filed on Jun. 30, 2005, now Pat. No. 7,760,276.

(30) Foreign Application Priority Data

Dec. 31, 2004    (KR) .............................. 2004-0118603

(51) Int. Cl.
*G02F 1/1343* (2006.01)
*G02F 1/1345* (2006.01)

(52) U.S. Cl. ........ 349/152; 349/138; 349/139; 349/141; 349/149

(58) Field of Classification Search .................. 349/141, 349/138, 139, 149, 152
See application file for complete search history.

(56) References Cited

U.S. PATENT DOCUMENTS

| 4,542,960 | A | | 9/1985 | Yang |
| 5,162,933 | A | | 11/1992 | Kakuda et al. |
| 5,166,816 | A | * | 11/1992 | Kaneko et al. ................. 257/59 |
| 5,317,433 | A | | 5/1994 | Miyawaki |
| 5,339,181 | A | | 8/1994 | Kim et al. |
| 5,462,887 | A | | 10/1995 | Gluek |
| 5,546,207 | A | * | 8/1996 | Kim .............................. 349/122 |
| 5,668,379 | A | | 9/1997 | Ono et al. |
| 5,731,856 | A | | 3/1998 | Kim et al. |
| 5,771,083 | A | | 6/1998 | Fujihara et al. |
| 5,793,460 | A | | 8/1998 | Yang |
| 5,847,781 | A | | 12/1998 | Ono et al. |
| 5,959,708 | A | | 9/1999 | Lee et al. |
| 6,034,757 | A | | 3/2000 | Yanagawa et al. |
| 6,215,542 | B1 | | 4/2001 | Lee et al. |
| 6,233,034 | B1 | | 5/2001 | Lee et al. |
| 6,256,081 | B1 | | 7/2001 | Lee et al. |

(Continued)

FOREIGN PATENT DOCUMENTS

CN    1290922 A    4/2001

(Continued)

*Primary Examiner* — Lauren Nguyen
(74) *Attorney, Agent, or Firm* — McKenna Long & Aldridge, LLP

(57) ABSTRACT

Disclosed is a thin film transistor substrate for a fringe filed switching type liquid crystal display device, and a fabrication method thereof, that reduces the number of required mask processes, and thus improves fabrication efficiency. The fabrication method involves three mask processes, wherein the masks are partial transmitting masks, and the resulting photoresist patterns have varying thicknesses. By having photoresist layers of varying thicknesses, structures can be formed in multiple etching steps using the same photo-resist pattern by incrementally removing the photo-resist according to its thickness. The thin film transistor substrate has a common line, a common electrode, a gate line and a gate electrode formed directly on the substrate. The common electrode overlaps the pixel electrode in the pixel area.

12 Claims, 72 Drawing Sheets

U.S. PATENT DOCUMENTS

| | | | |
|---|---|---|---|
| 6,281,953 B1 | 8/2001 | Lee et al. |
| 6,285,428 B1 | 9/2001 | Kim et al. |
| 6,319,760 B1 | 11/2001 | Lee et al. |
| 6,351,300 B1 | 2/2002 | Park et al. |
| 6,362,032 B1 | 3/2002 | Kim et al. |
| 6,362,858 B1 | 3/2002 | Jeon et al. |
| 6,388,726 B1 | 5/2002 | Kim et al. |
| 6,404,470 B1 | 6/2002 | Kim et al. |
| 6,429,057 B1 | 8/2002 | Hong et al. |
| 6,429,918 B1 | 8/2002 | Choi et al. |
| 6,449,026 B1 | 9/2002 | Min et al. |
| 6,456,351 B1 | 9/2002 | Kim et al. |
| 6,462,800 B1 | 10/2002 | Kim et al. |
| 6,512,503 B1 | 1/2003 | Kim et al. |
| 6,562,645 B2 | 5/2003 | Sung et al. |
| 6,580,487 B1 | 6/2003 | Kim et al. |
| 6,583,842 B2 | 6/2003 | Hong et al. |
| 6,678,027 B2 | 1/2004 | Park et al. |
| 6,741,311 B1 | 5/2004 | Hong et al. |
| 7,060,541 B2 | 6/2006 | Lee et al. |
| 2001/0005238 A1 | 6/2001 | Yun et al. |
| 2001/0005251 A1 | 6/2001 | Kim et al. |
| 2001/0005597 A1 | 6/2001 | Shin et al. |
| 2001/0006765 A1 | 7/2001 | Lee et al. |
| 2001/0007779 A1 * | 7/2001 | Lee et al. | 438/30 |
| 2001/0010576 A1 | 8/2001 | Lee et al. |
| 2001/0038370 A1 | 11/2001 | Yeung |
| 2001/0048500 A1 | 12/2001 | Lim et al. |
| 2001/0048501 A1 | 12/2001 | Kim et al. |
| 2002/0008828 A1 | 1/2002 | Park et al. |
| 2002/0041354 A1 | 4/2002 | Noh et al. |
| 2002/0044248 A1 | 4/2002 | Park et al. |
| 2002/0067453 A1 | 6/2002 | Kim et al. |
| 2002/0067454 A1 | 6/2002 | Hong et al. |
| 2002/0084459 A1 | 7/2002 | Choi et al. |
| 2002/0089630 A1 | 7/2002 | Liu et al. |
| 2002/0149729 A1 * | 10/2002 | Nishimura et al. | 349/141 |
| 2002/0163604 A1 | 11/2002 | Kim et al. |
| 2002/0180920 A1 | 12/2002 | Noh et al. |
| 2003/0076469 A1 | 4/2003 | Liu et al. |
| 2003/0098939 A1 | 5/2003 | Min et al. |
| 2003/0117558 A1 | 6/2003 | Kim et al. |
| 2003/0197181 A1 * | 10/2003 | Yun | 257/72 |
| 2003/0202140 A1 | 10/2003 | Liu |
| 2004/0061824 A1 * | 4/2004 | Ohta et al. | 349/141 |
| 2005/0030451 A1 | 2/2005 | Liu |
| 2005/0046775 A1 | 3/2005 | Lee et al. |
| 2005/0062923 A1 | 3/2005 | Lyu et al. |
| 2005/0068483 A1 | 3/2005 | Lee et al. |
| 2005/0078246 A1 | 4/2005 | Yoo et al. |
| 2005/0101044 A1 | 5/2005 | Cho et al. |

FOREIGN PATENT DOCUMENTS

| | | |
|---|---|---|
| CN | 1290952 | 4/2001 |
| CN | 1512253 | 7/2004 |
| CN | 1170196 | 10/2004 |
| JP | 2000-2886 | 1/2000 |
| JP | 2000-206550 | 7/2000 |
| JP | 2000-214487 | 8/2000 |
| JP | 2000-314897 | 11/2000 |
| JP | 2001-183685 | 7/2001 |
| KR | 2001-0063293 A | 7/2001 |
| KR | 10-0322968 B1 | 2/2002 |
| KR | 2002-0071049 A | 9/2002 |

* cited by examiner

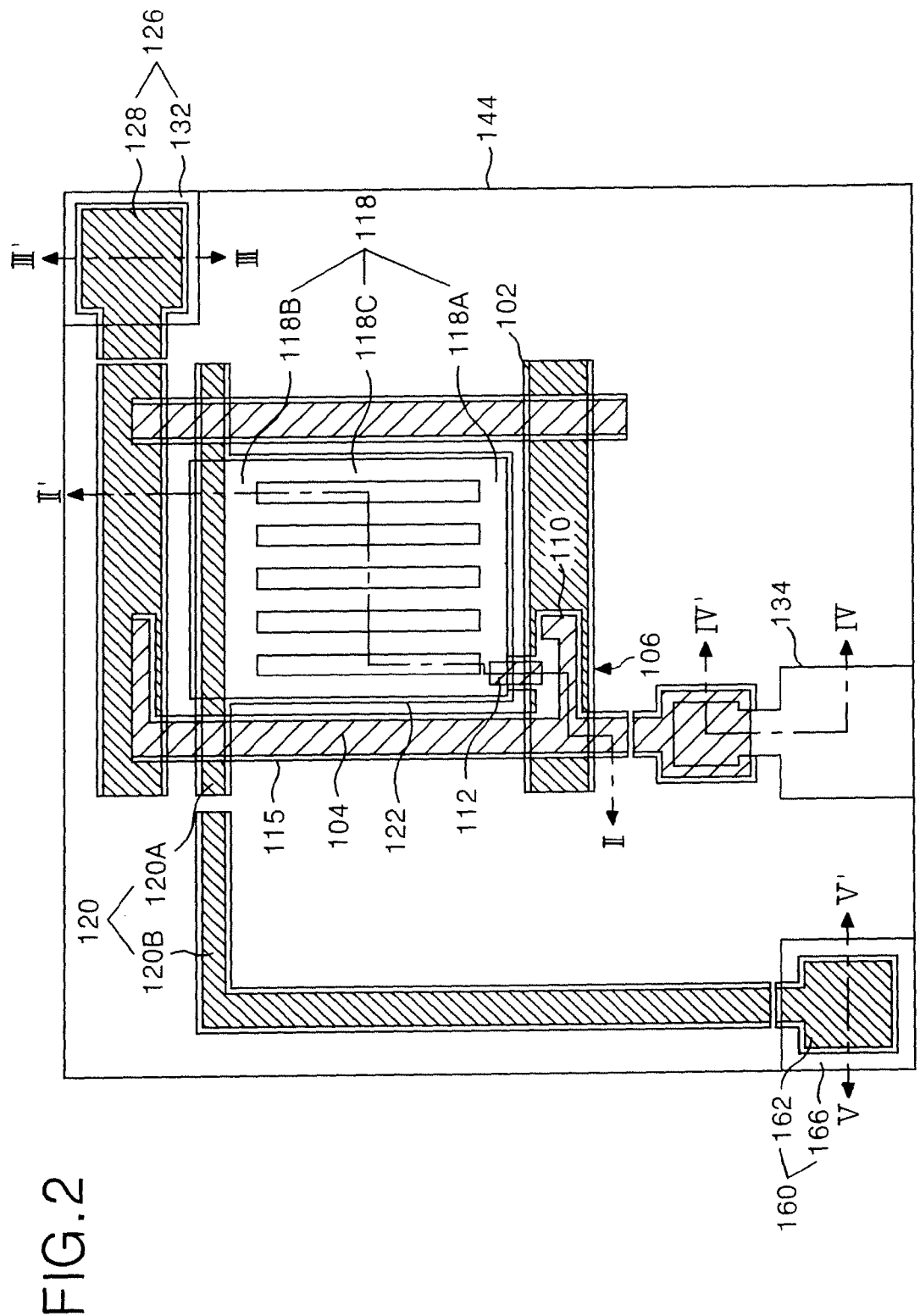

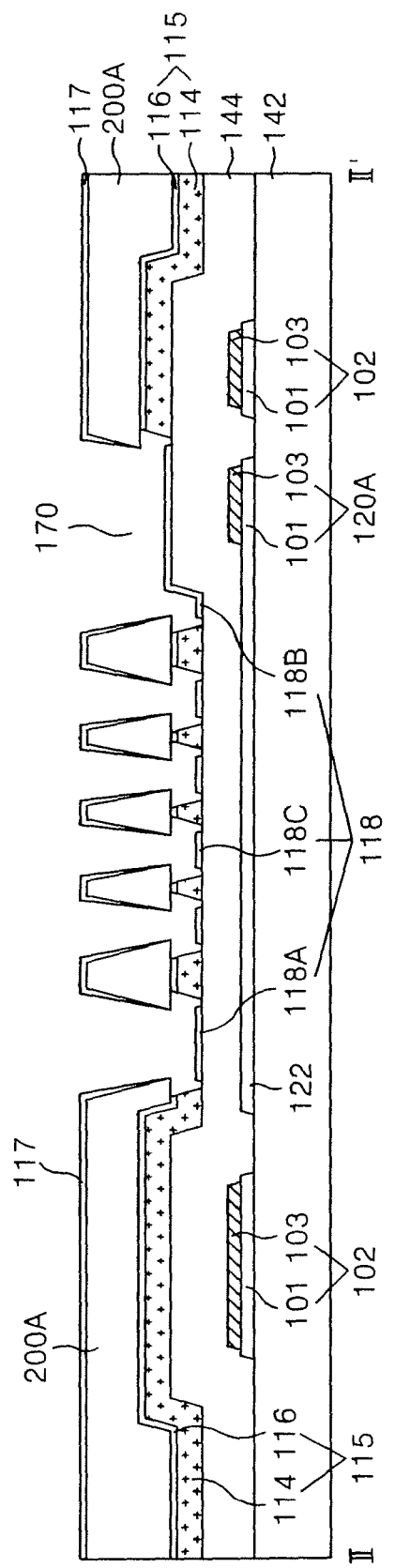

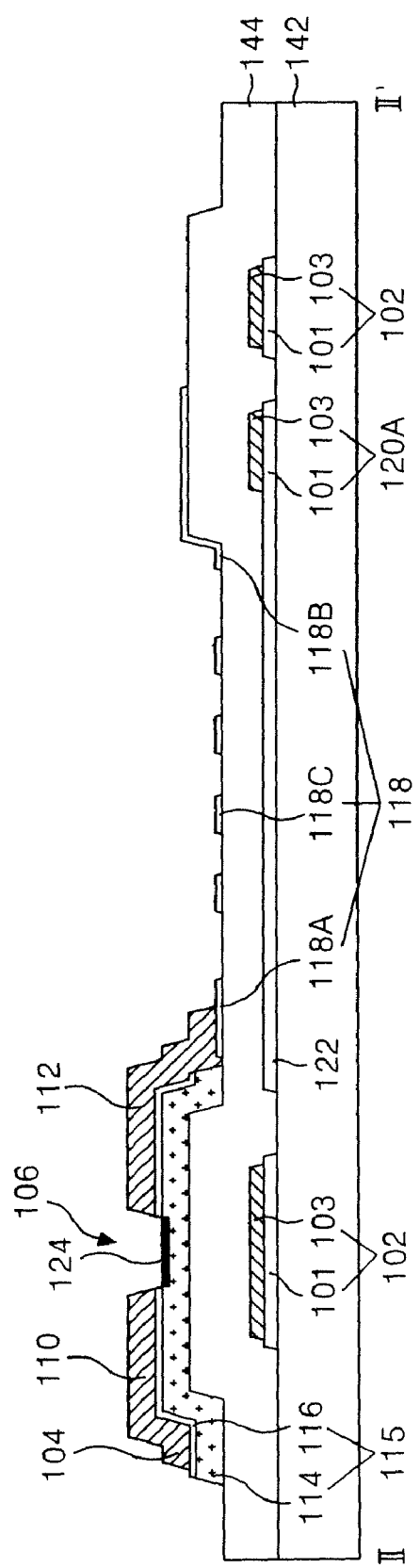

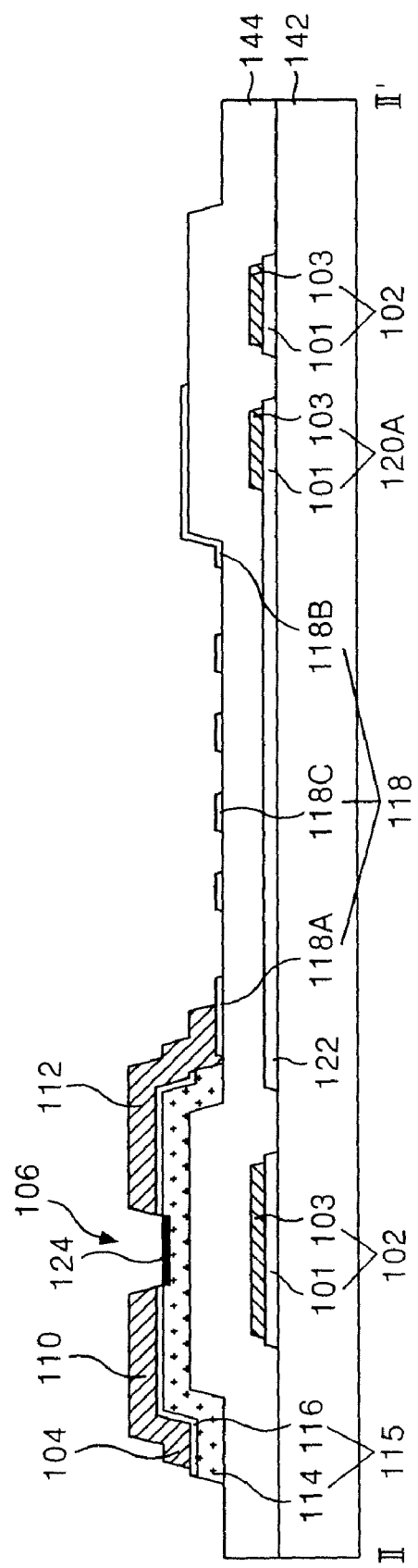

LIQUID CRYSTAL DISPLAY DEVICE AND FABRICATING METHOD THEREOF

This is a divisional application of U.S. patent application Ser. No. 11/169,571, filed on Jun. 30, 2005, now U.S. Pat. No. 7,760,276 which claims the benefit of the Korean Patent Application No. P2004-118603, filed on Dec. 31, 2004, all of which are hereby incorporated by reference for all purposes as if fully set forth herein.

BACKGROUND OF THE INVENTION

1. Field of the Invention

This invention relates to a thin film transistor substrate applied to a display device, and more particularly to a thin film transistor substrate of fringe field switching type that has a simplified fabricating process.

2. Description of the Related Art

Generally, a liquid crystal display (LCD) uses an electric field to control light transmission of a liquid crystal having a dielectric anisotropy to thereby display a picture. To this end, the LCD includes a liquid crystal display panel for displaying a picture through a liquid crystal cell matrix, and a driving circuit for driving the liquid crystal display panel.

Referring to FIG. 1, a related art liquid crystal display panel includes a color filter substrate 10 and a thin film transistor substrate 20 that are joined to each other with a liquid crystal 24 between them.

The color filter substrate 10 includes a black matrix 4, a color filter 6 and a common electrode 8 that are sequentially provided on an upper glass substrate 2. The black matrix 4 is provided in a matrix configuration on the upper glass substrate 2. The black matrix 4 divides an area of the upper glass substrate 2 into a plurality of cell areas to be provided with the color filter 6, and the black matrix 4 prevents a light interference between adjacent cells as well as external light reflection. The color filter 6 is provided in the cell area divided by the black matrix 4 in such a manner as to be divided into red (R), green (G) and blue (B) regions, thereby transmitting red, green and blue light. The common electrode 8 is formed from a transparent conductive layer entirely coated onto the color filter 6, and the common electrode 8 supplies a common voltage Vcom that serves as a reference voltage for driving of the liquid crystal 24. Further, an over-coated layer (not shown) for smoothing the color filter 6 may be provided between the color filter 6 and the common electrode 8.

The thin film transistor substrate 20 includes a thin film transistor 18 and a pixel electrode 22 provided for each cell area defined by a crossing of a gate line 14 and a data line 16 on a lower glass substrate 12. The thin film transistor 18 applies a data signal from the data line 16 to the pixel electrode 22 in response to a gate signal from the gate line 14. The pixel electrode 22, which is formed from a transparent conductive layer, supplies a data signal from the thin film transistor 18 to drive the liquid crystal 24.

Molecules of liquid crystal 24 having a dielectric anisotropy are rotated in accordance with an electric field generated by a data signal voltage between the pixel electrode 22 and a common voltage Vcom of the common electrode 8 to control light transmittance, thereby implementing a gray scale level.

Further, the liquid crystal display panel includes a spacer (not shown) for maintaining a constant cell gap between the color filter substrate 10 and the thin film transistor substrate 20.

In such a liquid crystal display panel, the color filter substrate 10 and the thin film transistor substrate 20 are formed by a plurality of mask processes. Herein, one mask process includes many sub-processes such as thin film deposition (coating), cleaning, photolithography, etching, photo-resist stripping and inspection processes.

Particularly, since the thin film transistor substrate includes semiconductor materials and requires a plurality of mask processes, its fabrication is complicated, which is a major factor in the manufacturing costs of the liquid crystal display panel. Therefore, reducing the number of mask process in fabricating the thin film transistor substrate is a key strategy in reducing manufacturing costs.

Liquid crystal display panels are generally classified into a vertical electric field type and a horizontal electric field type, depending upon the direction of the electric field driving the liquid crystal.

An example of the vertical electric field type is a twisted nematic (TN) mode liquid crystal display, in which a vertical electric field formed between a pixel electrode and a common electrode is arranged in opposition to each other on the upper and lower substrate. The vertical electric field type of liquid crystal display has an advantage of a large aperture ratio while having a drawback of a narrow viewing angle of about 90°.

An example of the horizontal electric field type is generated is an in plane switch (IPS) mode liquid crystal display, in which a horizontal electric field is generated between the pixel electrode and the common electrode arranged in parallel to each other on the lower substrate. A liquid crystal display of the horizontal electric field type has an advantage of a wide viewing angle about 160°, but has a disadvantage of low aperture ratio and transmittance.

In order to overcome the disadvantage of the liquid crystal display panel of horizontal electric field type, a liquid crystal display panel of fringe field switching (FFS) type has been developed, which operates by a fringe field. The FFS-type liquid crystal display panel includes a common electrode and a pixel electrode having an insulating film between them at each pixel area. Further, the fringe field allows all of liquid crystal molecules formed between the upper and lower substrates to be operated at each pixel area to thereby improve the aperture ratio and transmittance.

However, since the thin film transistor substrate included in the FFS-type liquid crystal display panel requires a plurality of mask processes as well as a semiconductor process, it has the disadvantage of a complicated fabricating process.

SUMMARY OF THE INVENTION

Accordingly, the present invention is directed to a thin film transistor substrate of fringe field switching type and fabricating method thereof, and liquid crystal display panel using the same and fabricating method thereof that substantially obviates one or more of the aforementioned problems due to limitations and disadvantages of the related art. In general, the present invention achieves this by providing a structure and fabrication process that reduces the required number of mask processes.

An advantage of the present invention is that it reduces the cost of fabricating a fringe field type liquid crystal display.

Another advantage of the present invention is that it reduces the time required to fabricate a fringe field type liquid crystal display Additional advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

The aforementioned and other advantages of the present invention are achieved with a liquid crystal display device, which comprises first and second substrates; a gate line on the first substrate; a common line on the first substrate; a common electrode on the first substrate, wherein the common electrode is connected to the common line; a gate insulating film on the gate line, the common line, and the common electrode; a data line on the gate insulating film, wherein the data line crosses the gate line; a thin film transistor having a gate electrode connected to the gate line, a source electrode connected to the data line, a drain electrode, and a semiconductor layer having a channel between the source electrode and the drain electrode; and a pixel electrode connected to the drain electrode.

In another aspect of the present invention, the aforementioned and other advantages are achieved by a method of fabricating a liquid crystal display device comprises providing first and second substrates; forming a gate line, a gate electrode connected to the gate line, a common line parallel to the gate line and a common electrode connected to the common line on the first substrate, using a first mask; forming a gate insulating film and a semiconductor layer having a pixel hole through the semiconductor layer, and forming a pixel electrode overlapping the common electrode in the pixel hole, using a second mask; and forming a source and drain metal pattern including a data line crossing the gate line, a source electrode connected to the data line and a drain electrode connected to the pixel electrode, and a channel between the source electrode and the drain electrode, using a third mask.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a plan view illustrating a structure of a thin film transistor substrate of fringe field switching type according to a first embodiment of the present invention;

FIGS. 6A through 6I are sectional views for explaining the first mask process;

FIGS. 9B through 9D are sectional views illustrating a third mask process in a method of fabricating the thin film transistor substrate of fringe field switching type according to an embodiment of the present invention, respectively;

FIGS. 10A through 10L are sectional views illustrating the third mask process;

DETAILED DESCRIPTION OF THE ILLUSTRATED EMBODIMENT

Reference will now be made in detail to embodiments of the present invention, examples of which are illustrated in the accompanying drawings. Hereinafter, the embodiments of the present invention will be described in detail with reference to FIGS. 2 to 18B.

Figure 1:
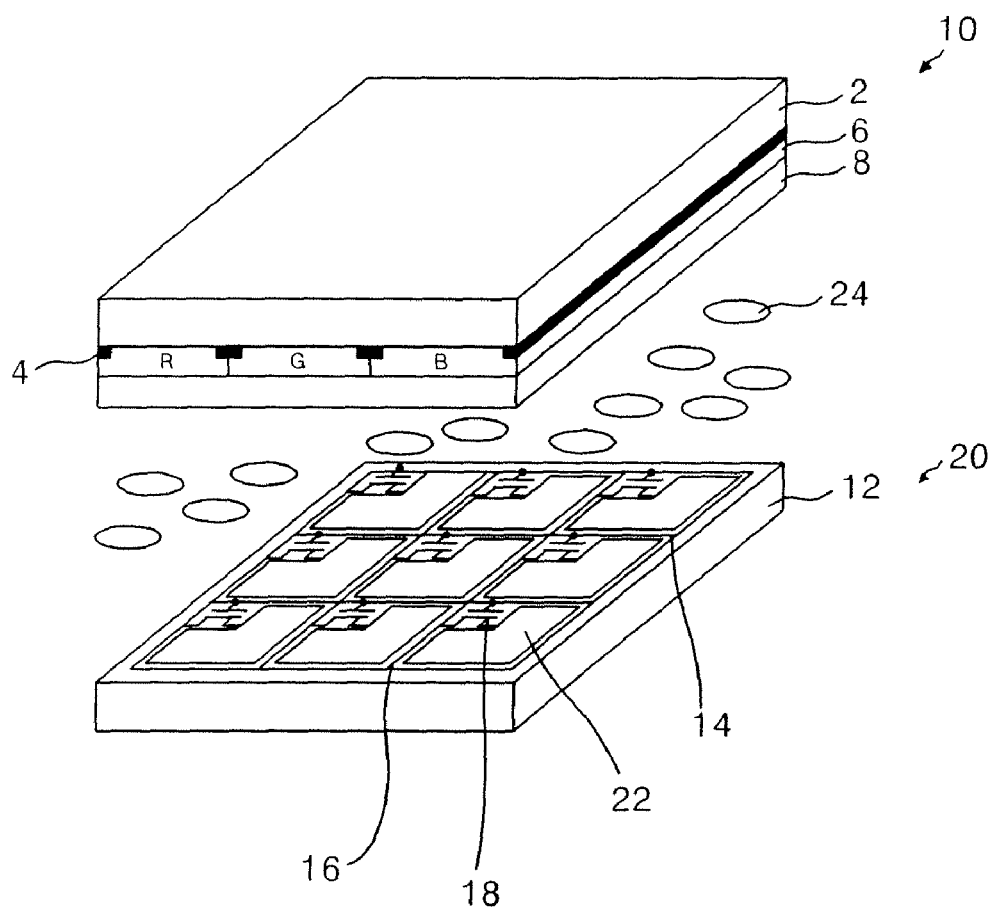
FIG. 1 is a schematic perspective view illustrating a structure of a related art liquid crystal display panel.
Figure 3A:
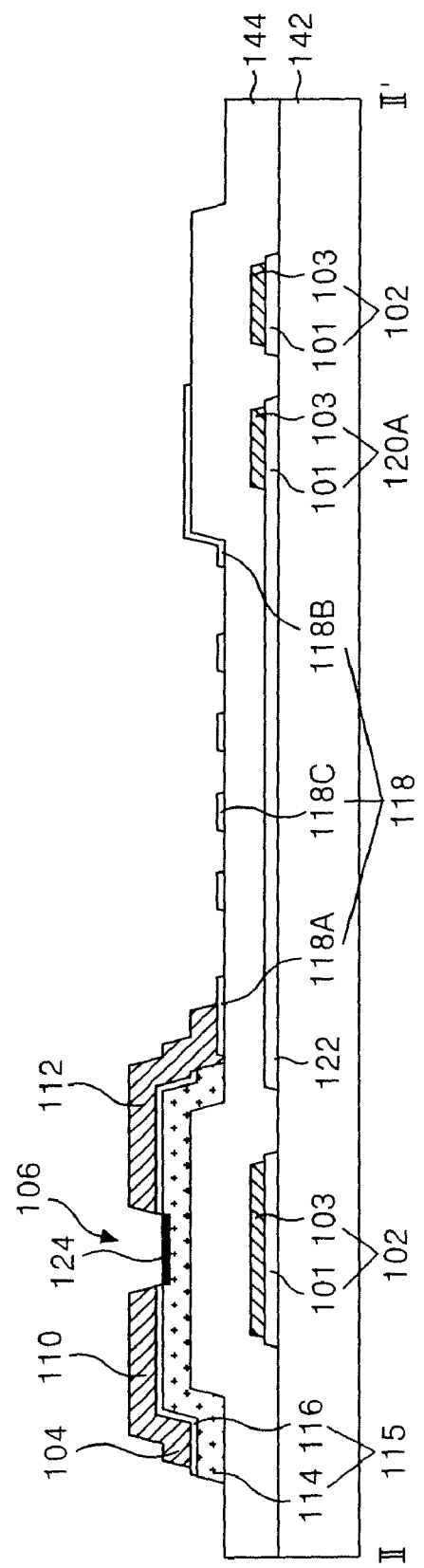
FIGS. 3A through 3D are sectional views of the thin film transistor substrate taken along the II-II', III-III' and IV-IV' lines in FIG. 2.
Figure 3B:
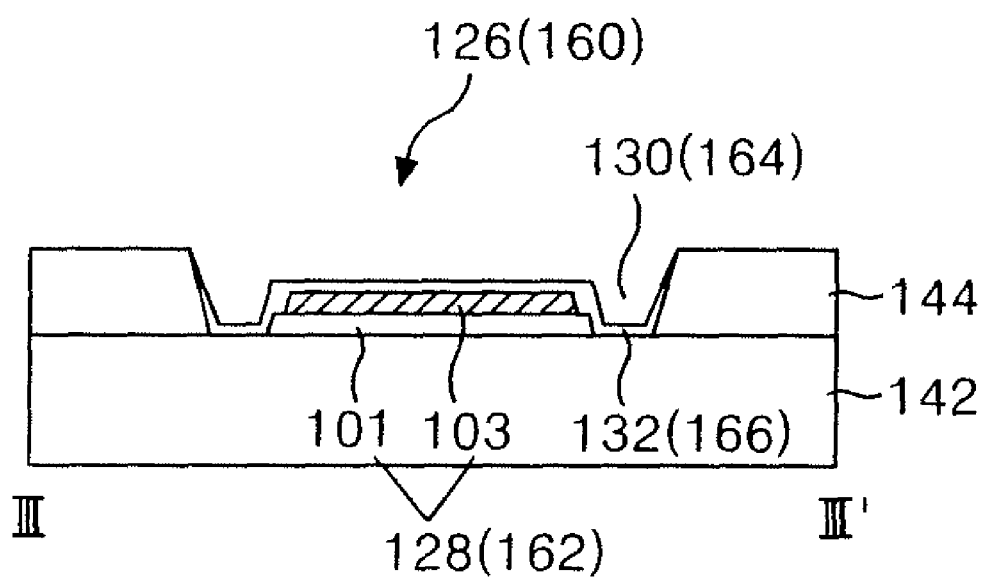
Figure 3C:
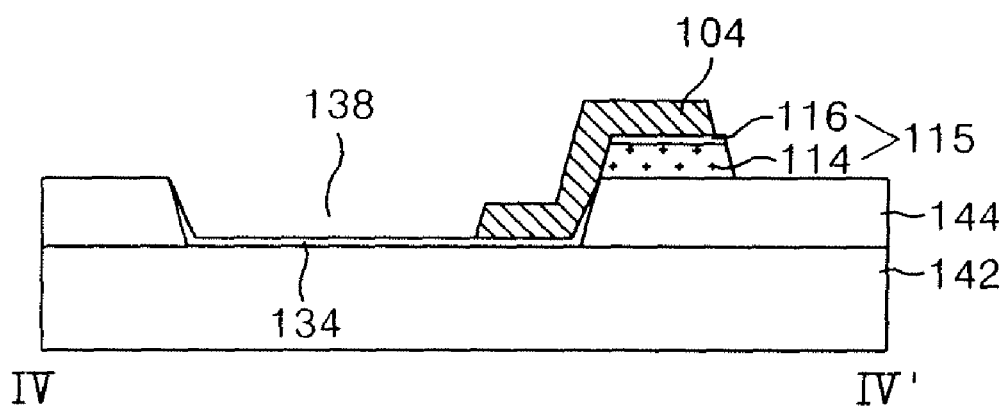

FIG. 2 is a plan view illustrating an exemplary a structure of a thin film transistor substrate of fringe field switching (FFS) type according to a first embodiment of the present invention, and FIGS. 3A through 3C are sectional views of the thin film transistor substrate respectively taken along the II-II', III-III' and IV-IV' lines in FIG. 2.

Referring to FIG. 2 and FIGS. 3A-3D, the FFS-type thin film transistor substrate includes a gate line 102 and a data line 104 provided on a lower substrate 142 in such a manner as to cross each other with a gate insulating film 144 between them, wherein the crossing gate lines 102 and data lines 104 define a pixel area. The FFS-type thin film transistor substrate includes a thin film transistor 106 connected at each crossing; a pixel electrode 118 provided at a pixel area; a common electrode 122 provided, along with the pixel electrode 118, at the pixel area to form a fringe field; and a common line connected to the common electrode 122. Further, the thin film transistor substrate includes a gate pad 126 connected to the gate line 102, and a data pad 134 connected to the data line 104.

The gate line 102 supplies a scanning signal from a gate driver (not shown) while the data line 104 supplies a video signal from a data driver (not shown).

The gate line 102 is formed on the substrate 142 in a multiple-layer structure having at least double gate metal layers. For example, the gate line 102 may have a double-layer structure in which a first conductive layer 101 includes a transparent conductive layer, and a second conductive layer 103 is formed of an opaque metal. The first conductive layer 101 may be formed of a transparent metal, such as ITO, TO, IZO or ITZO. The second conductive layer may be formed of Cu, Mo, Al, a Cu alloy, a Mo alloy or an Al alloy. Alternatively, the gate line 102 may be formed only of the second conductive layer 103.

The thin film transistor 106 allows a pixel signal voltage applied to the data line 104 to be charged to the pixel electrode 118 and maintained in response to a scanning signal applied to the gate line 102. To this end, the thin film transistor 106 includes a gate electrode included in the gate line 102; a source electrode 110 connected to the data line 104; a drain electrode 112 positioned in opposition to the source electrode 110 and connected to the pixel electrode 118; an active layer 114 overlapping with the gate line 102 and having the gate insulating film 144 between them to provide a channel between the source electrode 110 and the drain electrode 112; and an ohmic contact layer 116 formed on the active layer 114 other than the channel portion to make an ohmic contact with the source electrode 110 and the drain electrode 112.

Further, as illustrated in FIG. 3C, a semiconductor layer 115 including the active layer 114 and the ohmic contact layer 116 is overlapped along the data line 104.

The common line 120 and the common electrode 122 supply a reference voltage for driving the liquid crystal, that is, a common voltage to each pixel.

To this end, the common line 120 includes an internal common line 120A provided in parallel to the gate line 102 at a display area, and an external common line 120B connected to the internal common line 120A in an non-display area. The common line 120 is formed in a layered structure of first and second conductive layers 101 and 103, similar to the gate line 102. Alternatively, the common line 120 may be formed only of the second conductive layer 103.

The plate-shaped common electrode 122 is provided within the pixel area and connected to the internal common line 120A. The common electrode 122 may be extended from the first conductive layer 101 of the internal common line 120A into each pixel area and formed into a plate shape. In other words, the common electrode 122 may be formed from a transparent conductive layer integral to the first conductive layer 101 of the common line 120.

The pixel electrode 118 overlaps the common electrode 122 with the gate insulating film 144 between them at each pixel area, where they form a fringe field. Further, the pixel electrode 118 is provided on the gate insulating film 144 and is connected to the drain electrode 112 protruding from an overlapping portion. The semiconductor layer 115 may be formed such that it does not overlap between the drain electrode 112 and the pixel electrode 118. The pixel electrode 118 overlaps with the common line 120A. The pixel electrode 118 may include a first horizontal part 118A parallel to the gate line 102, a second horizontal part 118B overlapping with the common line 120A, and a plurality of vertical parts 118C connected between the first and second horizontal parts 118A and 118B. If a video signal is applied, via the thin film transistor 106, to the pixel electrode 118, then the pixel electrode 118 forms a fringe field along with the plate-shaped common electrode 122 supplied with the common voltage. Liquid crystal molecules arranged in a horizontal direction between the thin film transistor array substrate and the color filter array substrate by such a fringe field are rotated due to their dielectric anisotropy. Transmittance of light through the pixel area is differentiated depending upon the extent of rotation of the liquid crystal molecules, thereby implementing a gray level scale.

Further, the overlapping portion between the common electrode 122 and the pixel electrode 118 is provided with a storage capacitor for stably maintaining a video signal voltage applied to the pixel electrode 118.

The gate line 102 receives a scanning signal from a gate driver via the gate pad 126. The gate pad 126 includes a lower gate pad electrode 128 extended from the gate line 102, and an upper gate pad electrode 132 provided within a first contact hole 130 passing through the gate insulating film 144 to be connected to the lower gate pad electrode 128. Herein, the upper gate pad electrode 132, along with the pixel electrode 118, is formed from a transparent conductive layer, and makes an interface with the edge of the gate insulating film 144 surrounding the first contact hole 130.

The common line 120 receives a common voltage from a common voltage source via the common pad 160. The common pad 160 has a substantially similar vertical structure to the gate pad 126. In other words, the common pad 160 includes a lower common pad electrode 162 extended from the common line 120, and an upper common pad electrode 166 provided within a second contact hole 164 passing through the gate insulating film 144 to be connected to the lower common pad electrode 162. Herein, the upper common pad electrode 166, along with the pixel electrode 118, is formed from a transparent conductive layer, and makes an interface with the edge of the gate surrounding film 144 surrounding the second contact hole 164.

Figure 3D:
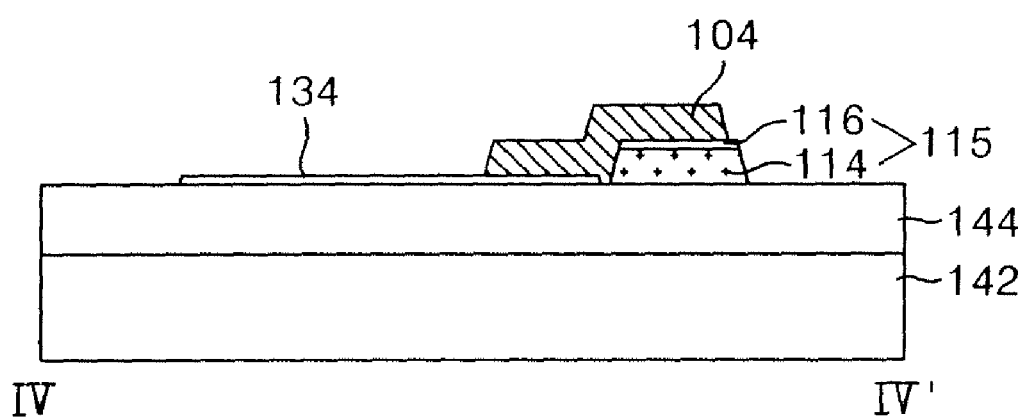

The data line 104 receives a pixel signal from a data driver via a data pad 134. As illustrated in FIG. 3C, the data pad 134 is formed from a transparent conductive layer within a third contact hole 138 passing through the gate insulating film 144. The third contact hole 138 provided with the data pad 134 is extended in such a manner to overlap with a portion of the data line 104. Thus, the data line 104 protrudes from the overlapping portion between it and the semiconductor layer 115 to be connected to the extending portion of the data pad 134. FIG. 3D illustrates an alternative data pad 134 configuration in which the data pad 134 is formed from a transparent conductive layer on the gate insulating film 144, and is extended in such a manner to overlap with the data line 104. Thus, the data line 104 protrudes from the overlapping portion between it and the semiconductor layer 115 substantially adjacent to the extending portion of the data pad 134.

Figure 4:
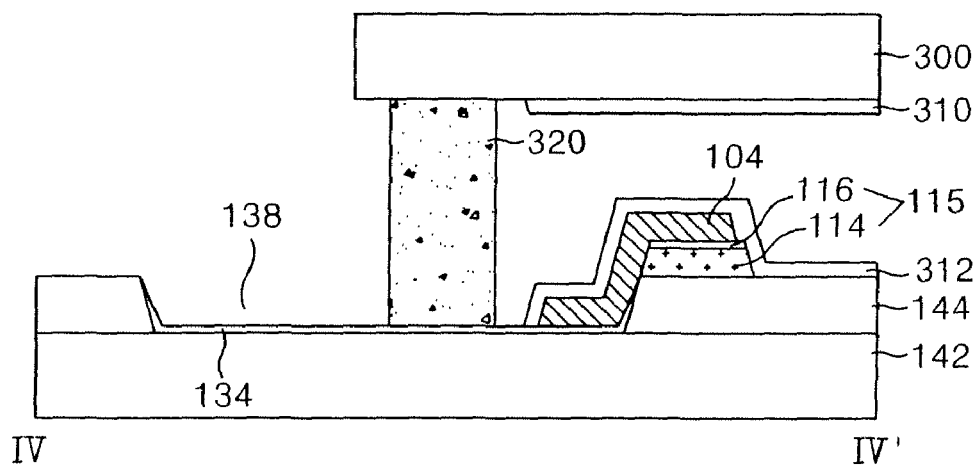
FIG. 4 is a sectional view illustrating a data pad area of a liquid crystal display panel employing the thin film transistor substrate of fringe field switching type illustrated in FIG. 3.

In this case, the data line 104 is exposed due to an absence of the protective film. In order to prevent the data line 104 from being exposed and oxidized, as illustrated in FIG. 4, the extending portion of the data pad 134 and the connecting portion of the data line 104 are positioned within an area sealed by a sealant 320. The data line 104 positioned within the sealed area is protected by a lower alignment film 312, which is formed on the thin film transistor substrate.

Referring to FIG. 4, a thin film transistor substrate formed with the lower alignment film 312 and a color filter substrate 300 coated with an upper alignment film 310 are joined to each other by the sealant 320, and a cell gap formed between the two substrates sealed by the sealant 320 is formed with a liquid crystal. The upper and lower alignment films 310 and 312 are formed with an organic insulating material on a picture display area of the two substrates. The sealant 320 is spaced in such a manner as to not be in contact with the upper and lower alignment films 310 and 312 for the purpose of protecting the sealants adhesive. Thus, the data line 104 provided at the thin film transistor substrate, along with the source electrode 110 and the drain electrode 112, is located within an area sealed by the sealant 320, so that it can be sufficiently protected by the lower alignment film 312 coated thereon as well as by the liquid crystal formed in the sealed area.

In the exemplary thin film transistor substrate according to a first embodiment of the present invention, as described above, a transparent conductive pattern including the pixel electrode 118, the upper gate pad electrode 132, the upper common pad electrode 166 and the data pad 140 is formed by a lift-off process using a photo-resist pattern defining the contact holes 130, 164 and 138 passing through the gate insulating film 144. Thus, the transparent conductive pattern is formed on the gate insulating film 144, or within the corresponding hole in such a manner as to interface with the gate insulating film 144.

Further, the semiconductor layer 115 is patterned in a substantially similar manner to the gate insulating film 144 and then has an exposed portion removed upon formation of a source/drain metal pattern including the data line 104, the source electrode 110 and the drain electrode 112, which substantially overlay the semiconductor layer 115. Further, upon formation of the source/drain metal pattern, the active layer 114 is exposed to define a channel of the thin film transistor 106. Thus, the semiconductor layer 115 has a structure formed at a portion where a transparent conductive pattern does not exist in the channel portion between the source electrode 110 and at the drain electrode 112 and at the overlapping portion between the source/drain metal pattern and the gate insulating film 144. This is because the transparent conductive pattern is formed at a portion where the semiconductor layer 115 is removed. A surface layer 124 of the exposed active layer 114 is subject to a surface treatment by a plasma, so that the channel portion of the active layer 114 may be protected by the surface layer 124 oxidized by $SiO_2$.

The exemplary FFS-type thin film transistor substrate according to the first embodiment of the present invention having the above-mentioned structure is formed by the following three-round mask process.

Figure 5A:
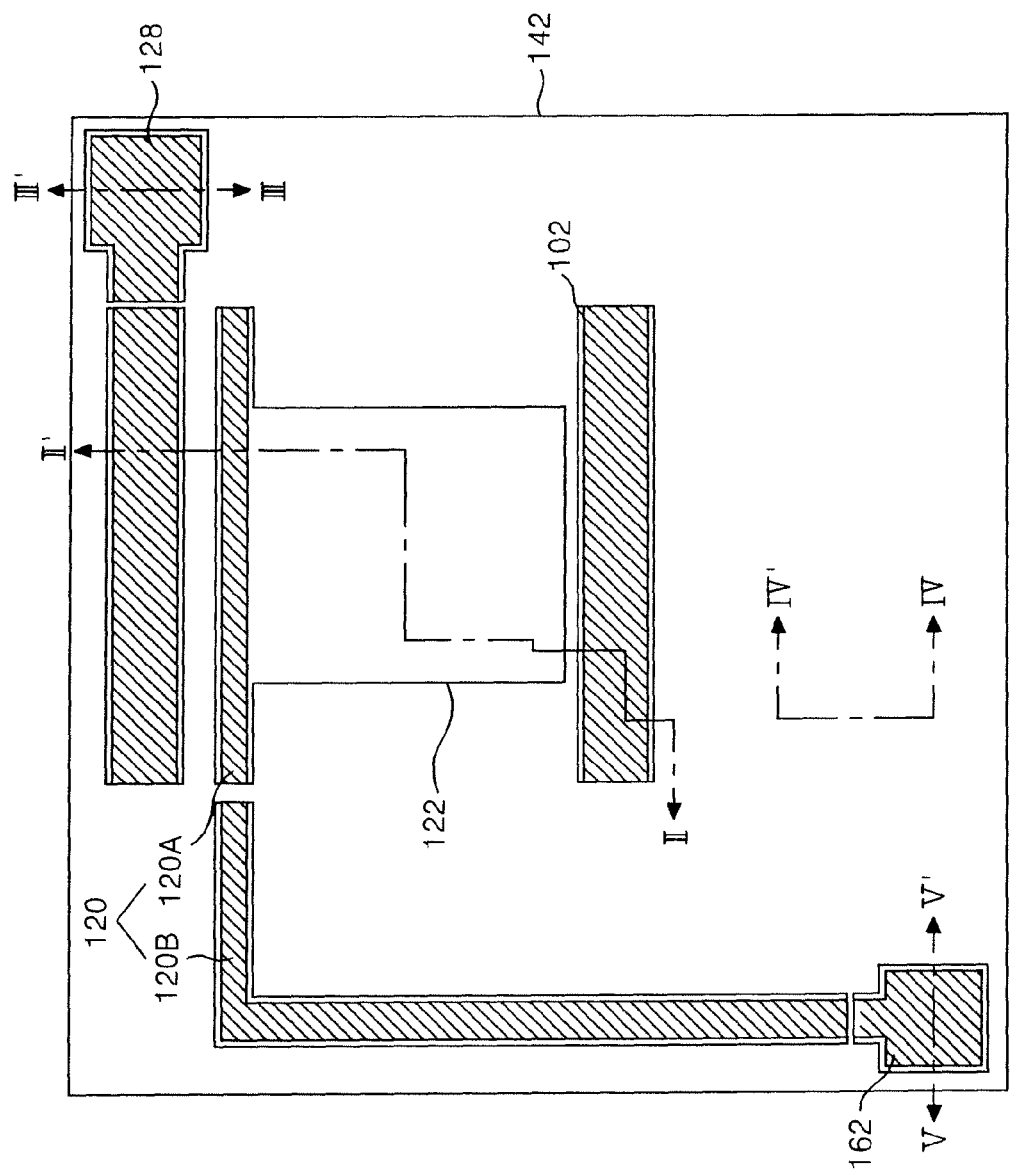
FIG. 5A is a plan view illustrating a first mask process in a method of fabricating a thin film transistor substrate of a fringe field switching type LCD according to the present invention.
Figure 5B:
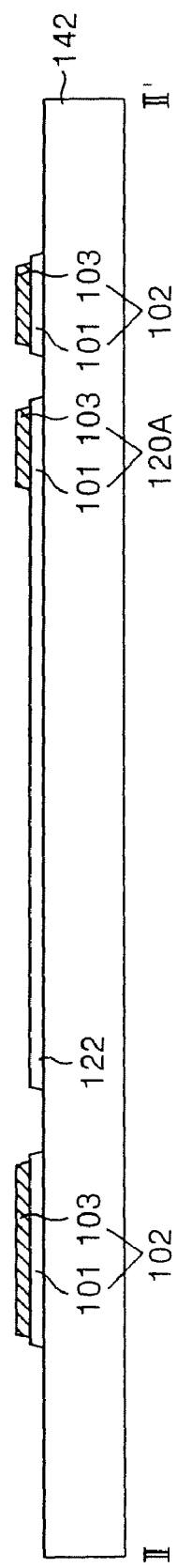
FIGS. 5B through 5D are sectional views further illustrating the first mask process illustrated in FIG. 5A.
Figure 5C:
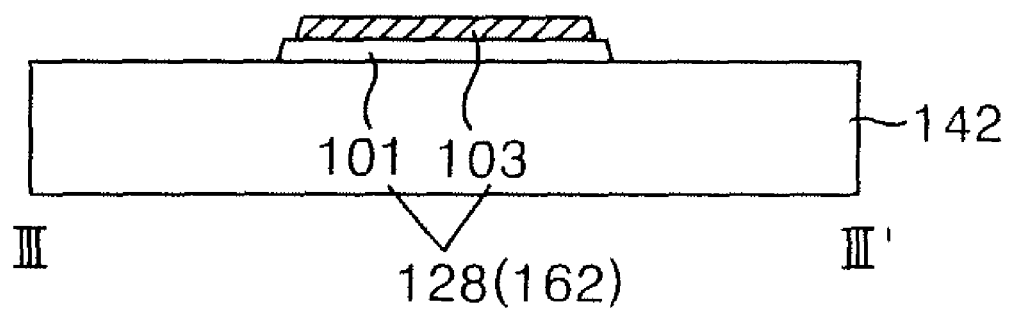
Figure 5D:

FIG. 5A a plan view and FIGS. 5B-5D are sectional views for explaining a first mask process in an exemplary method of fabricating the thin film transistor substrate of fringe field switching type according to the present invention, and FIGS. 6A-6I are sectional views illustrating the first mask process.

A first mask pattern group including the gate line 102, the lower pad electrode 128, the common line 120, the common electrode 122 and the lower common pad electrode 162 is formed on the lower substrate 142 by the first mask process. Herein, the first mask pattern group other than the common electrode 122 may have a multiple-layer structure in which at least two conductive layers are built. However, for the purpose of simplifying the explanation, there will be described only a double-layer structure having the first and second conductive layers 101 and 103. The common electrode 122 has a single-layer structure of the first conductive layer 101 that is a transparent conductive layer. The first mask pattern group having a multiple-layer structure and single-layer structure is formed using a single mask process using a partial transmitting mask such as a diffractive exposure mask or a half tone mask.

Figure 6A:
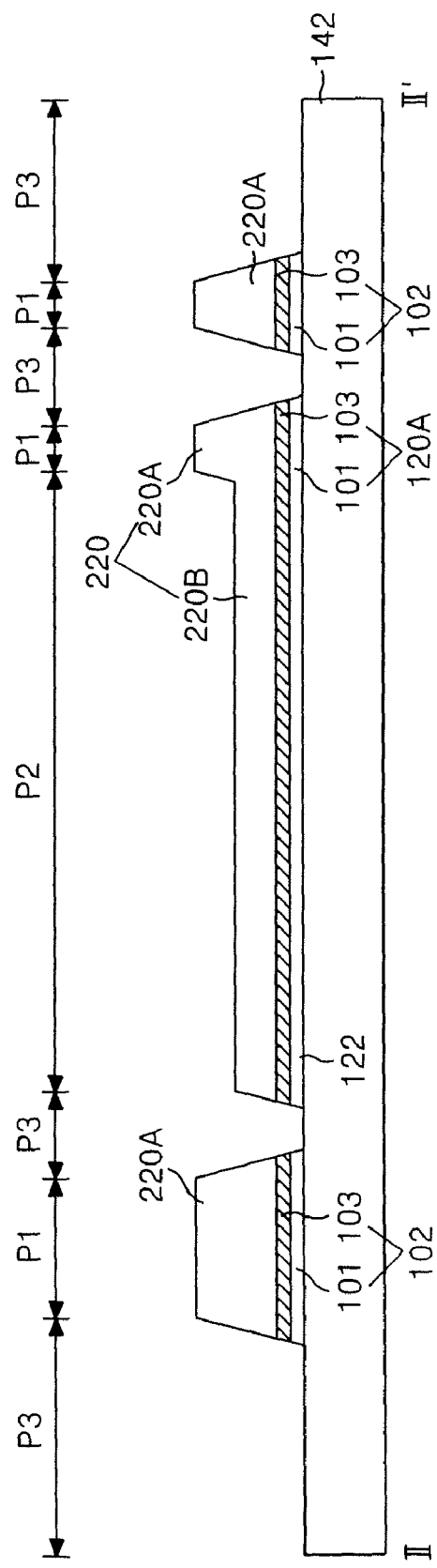

Referring to FIG. 6A, the first and second conductive layers 101 and 103 are formed on the lower substrate 142 by a deposition technique such as the sputtering. The first conductive layer 101 is formed of a transparent conductive material such as ITO, TO, IZO or ITZO. The second conductive layer 103 may include a single layer formed of a metal material such as Mo, Ti, Cu, AlNd, Al, Cr, a Mo alloy, a Cu alloy or an Al alloy or may include a layered structure of at least double layers such as Al/Cr, Al/Mo, Al(Nd)/Al, Al(Nd)/Cr, Mo/Al (Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo alloy, Mo-alloy/Al, Al-alloy/Mo-alloy, Mo-alloy/Al-alloy, Mo/Al alloy, Cu/Mo alloy or Cu/Mo(Ti).

Subsequently, a first photo-resist pattern 220 including photo-resist patterns 220A and 220B having different thicknesses is formed by photolithography using the partial transmitting mask. The partial transmitting mask includes a shielding part for shielding ultraviolet light; a partial transmitting part for diffracting the ultraviolet light using a slit pattern or partially transmitting the ultraviolet light using a phase-shifting material; and a full transmitting part for fully transmitting the ultraviolet light. The first photo-resist pattern 220 including photo-resist patterns 220A and 220B and an aperture part is formed by photolithography using the partial transmitting mask. In this case, a relatively thick photo-resist pattern 220A is formed at a shielding area P1 overlapping with the shielding part of the partial transmitting mask; the photo-resist pattern 220B is formed at a partial exposure area P2 overlapping with the partial transmitting part; and the aperture part is provided at an full exposure area P3 overlapping with the full transmitting part.

Further, the exposed portions of the first and second conductive layers 101 and 103 are etched by an etching process using the first photo-resist pattern 220 as a mask, thereby providing the first mask pattern group including a double-layer structure of the gate line 102, the lower gate pad electrode 126, the common line 120, the common electrode 122 and the lower common pad electrode 162.

Figure 6B:
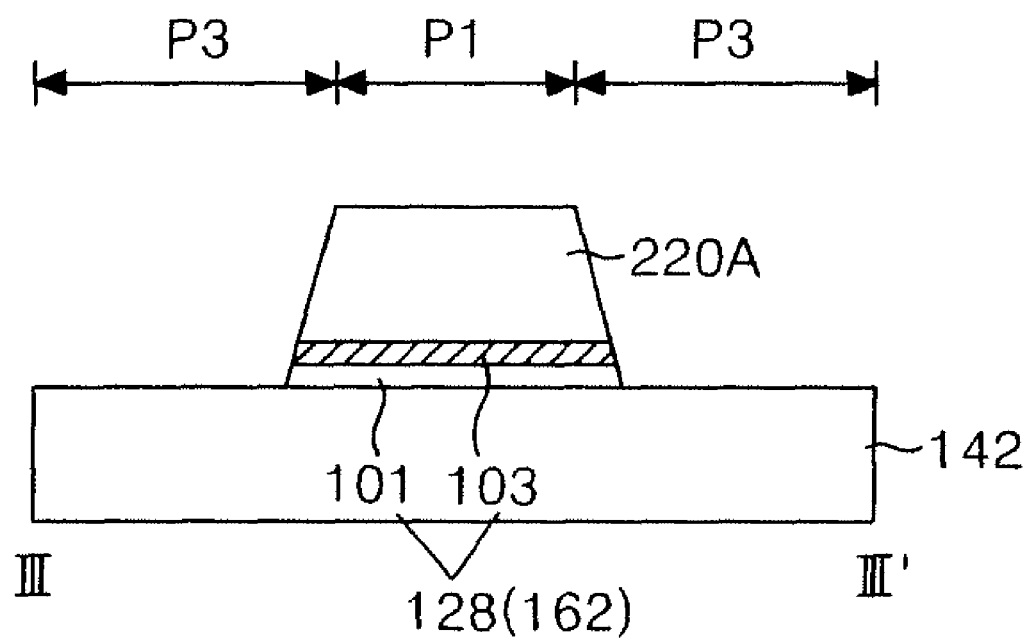
Figure 6C:
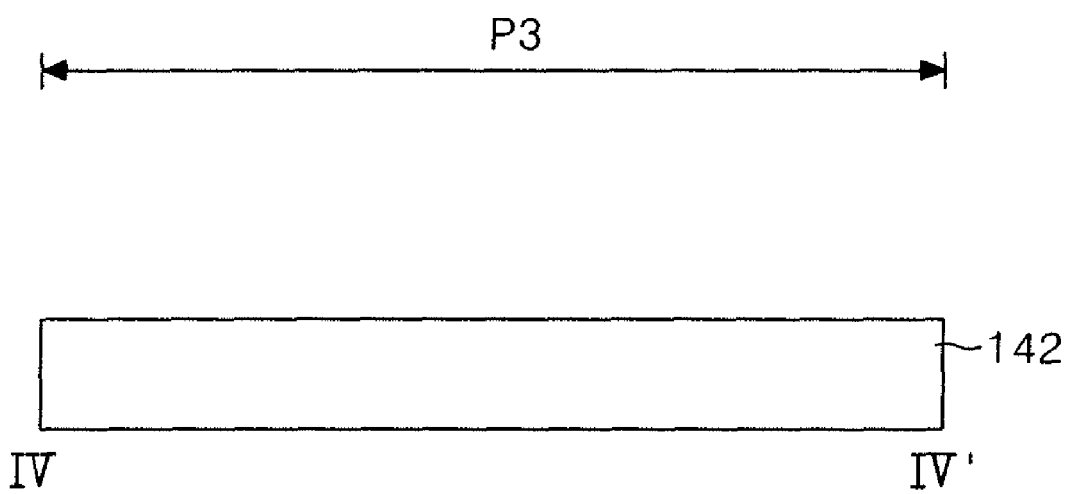
Figure 6D:
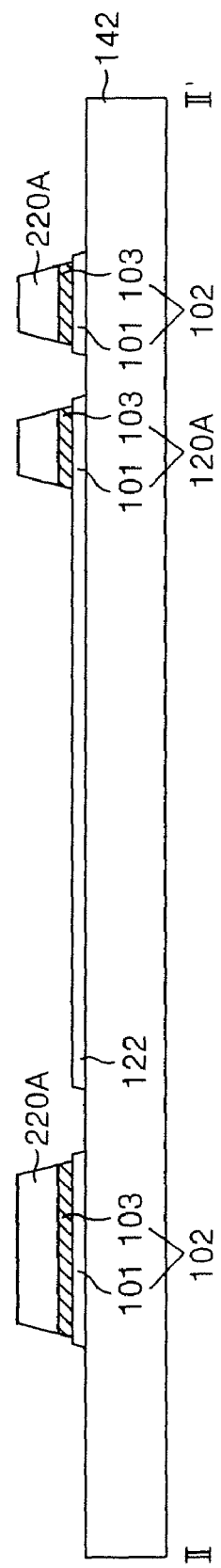
Figure 6E:
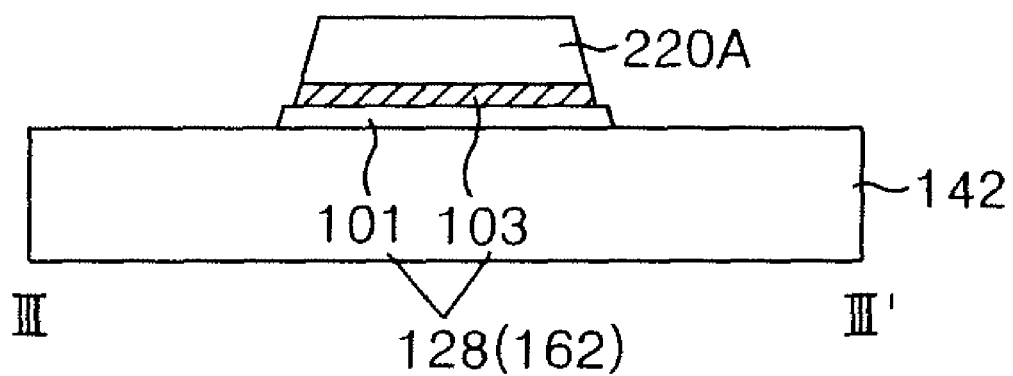
Figure 6F:
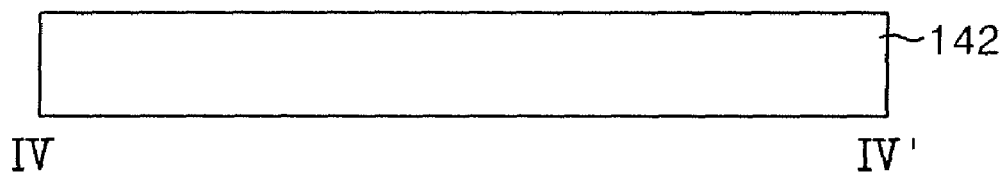

Referring to FIG. 6D-6F, the thickness of the photo-resist pattern 220A is reduced and the photo-resist pattern 220B is removed by an ashing process using an oxygen ($O_2$) plasma. Then, the second conductive layer 103 on the common electrode 122 is removed by an etching process using the ashed photo-resist pattern 220A as a mask. In this case, the regions surrounding the patterned second conductive layer 103 is again etched according to the ashed photo-resist pattern 220A, thereby allowing the first and second conductive layers 101 and 103 of the first mask pattern group to have a substantially constant thickness and a step-like shape. Accordingly, when the side surfaces of the first and second conductive layers 101 and 103 have a very steep inclination, it becomes possible to prevent step coverage defects in the gate insulating film 152 that may be generated.

Figure 6G:
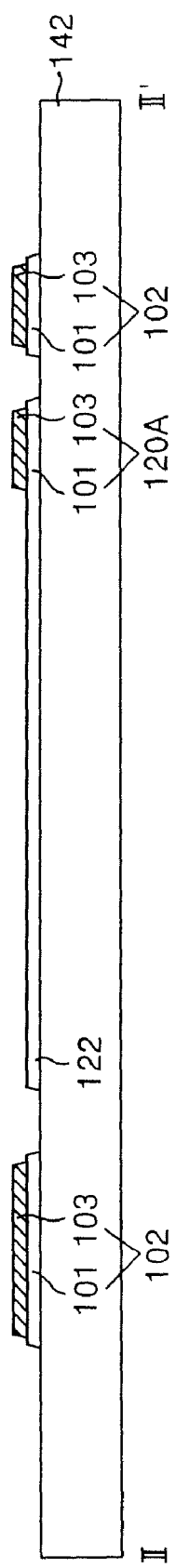
Figure 6H:
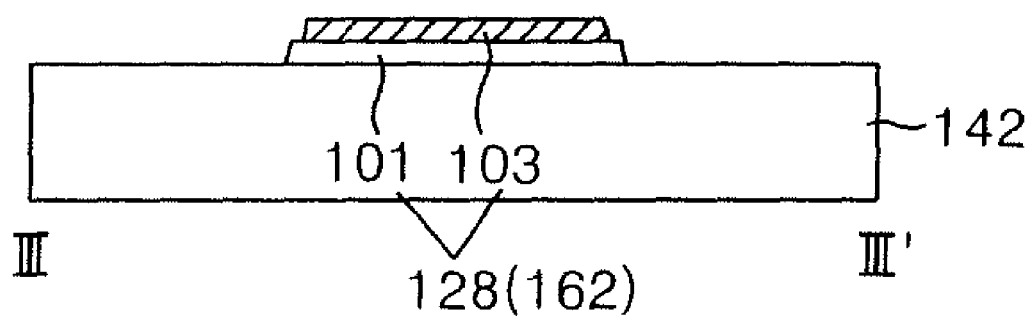
Figure 61:

Referring to FIG. 6G-6I, the photo-resist pattern 220A left on the first mask pattern group in FIG. 6B is removed by a stripping process.

Figure 7A:
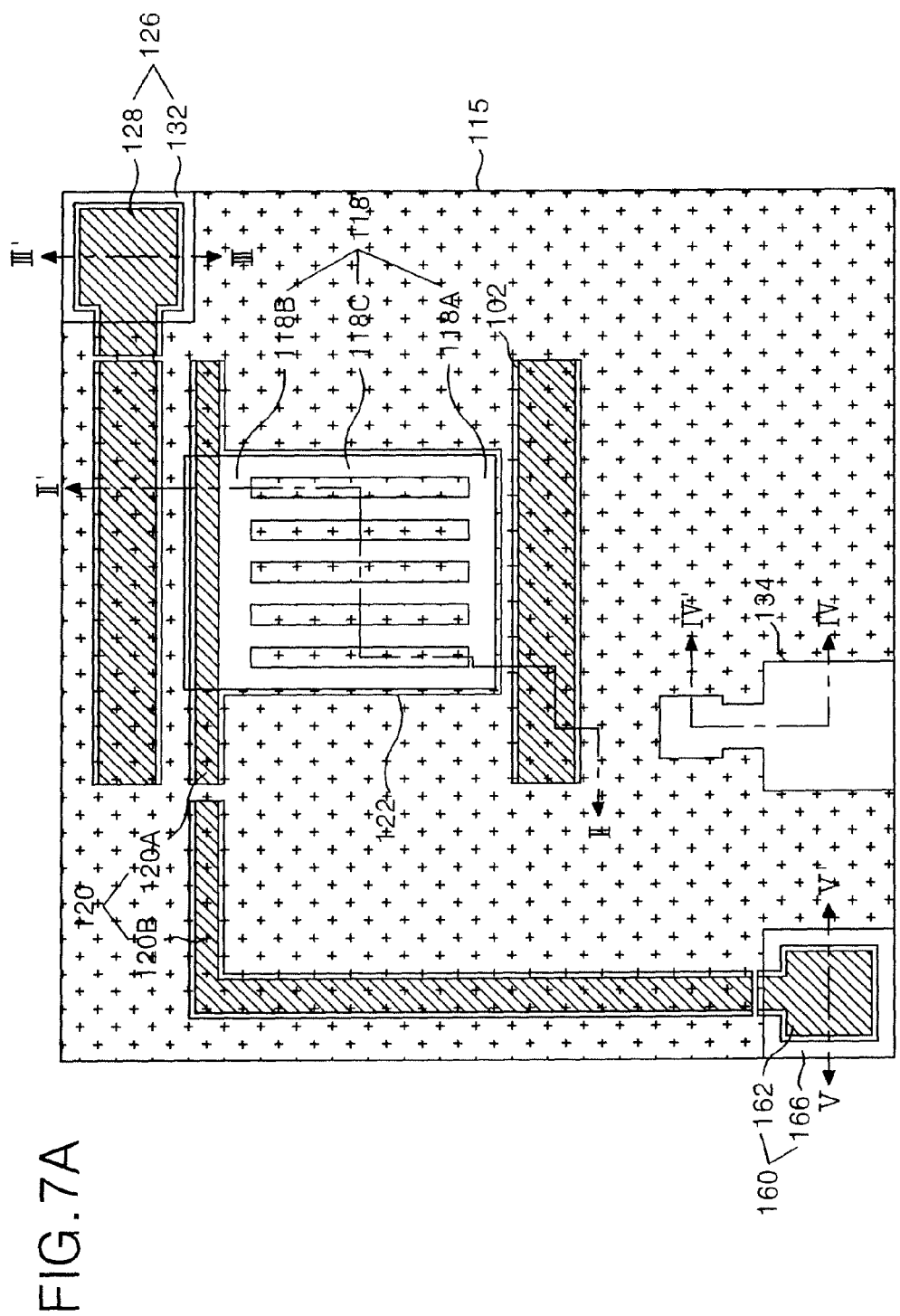
FIG. 7A is a plan view illustrating a second mask process in a method of fabricating the thin film transistor substrate of fringe field switching type according to an embodiment of the present invention.
Figure 7B:
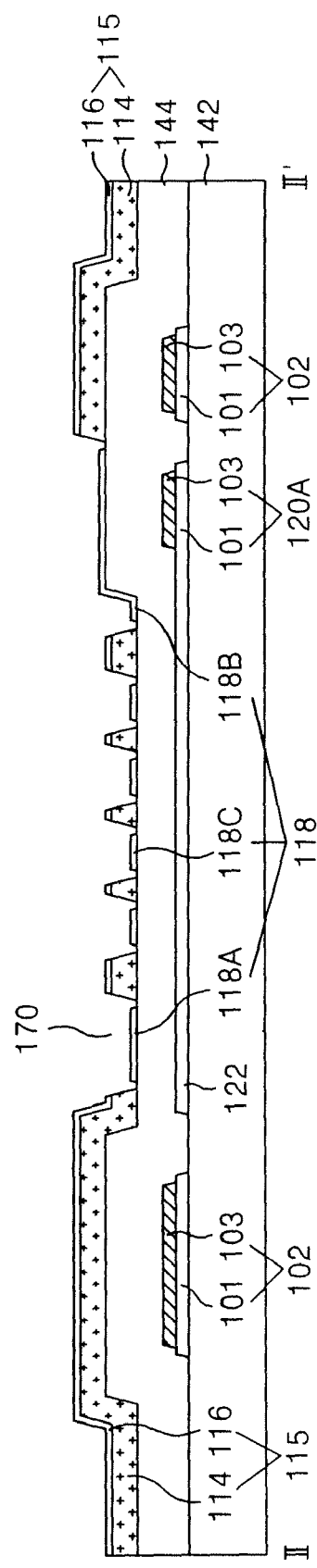
FIGS. 7B through 7D are sectional views further illustrating a second mask process in a method of fabricating the thin film transistor substrate of fringe field switching type according to the embodiment of the present invention.
Figure 7C:
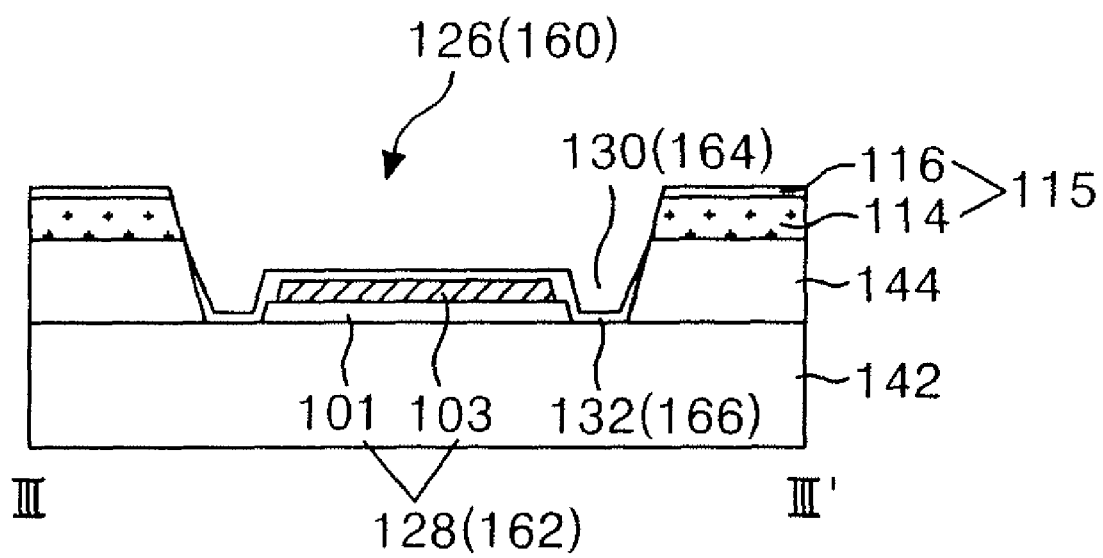
Figure 7D:
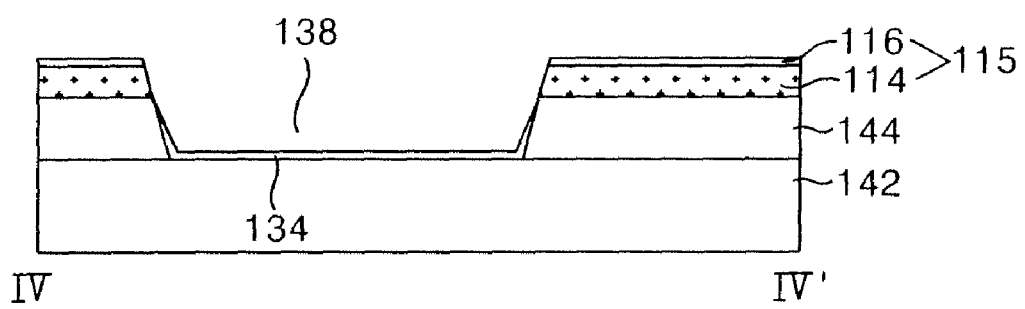

FIG. 7A is a plan view, and FIGS. 7B-7D are sectional views illustrating a second mask process in an exemplary method of fabricating the FFS-type thin film transistor substrate according to the present invention. FIGS. 8A-8J are sectional views for explaining the second mask process.

The gate insulating film 144, and the semiconductor layer 115, which includes the active layer 114 and the ohmic contact layer 116, is deposited on the lower substrate 142 provided with the first mask pattern group. A pixel hole 170 passing through the semiconductor layer 115, and the first to third contact holes 130, 164 and 138 passing through the gate insulating film 144, are defined by the second mask process. Further, a transparent conductive pattern including the pixel electrode 118, the upper gate electrode 132, the common pad electrodes 166, and the data pad 134 is formed within the corresponding holes. Herein, the pixel hole 170 and the first to third contact holes 130, 164 and 138 having different depths are defined by a single of mask process employing a partial transmitting mask such as a diffractive exposure mask or a half tone mask.

Figure 8A:
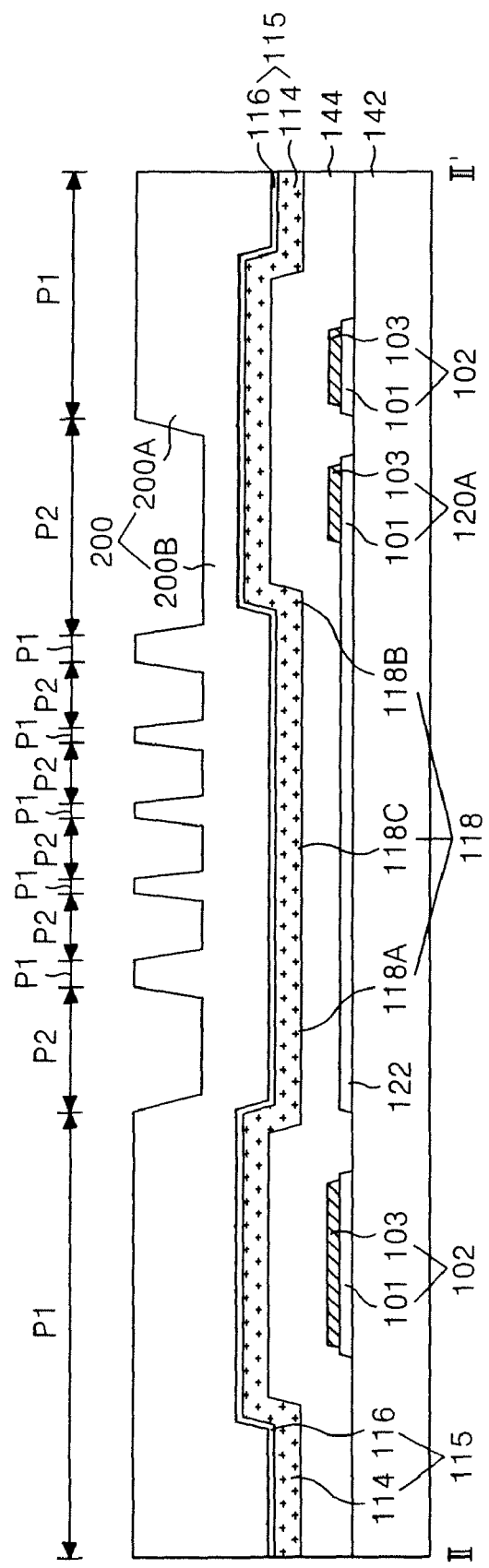
FIGS. 8A trough 8L are sectional views further illustrating the second mask process.

Referring to FIG. 8A, the gate insulating film 144 and the semiconductor layer 115 including the active layer 114 and the ohmic contact layer 116 are sequentially deposited on the lower substrate 142, which has the first mask pattern group, by a deposition technique such as the PECVD, etc. Herein, the gate insulating film 144 may be formed of an inorganic insulating material such as silicon nitride ($SiN_x$) or silicon oxide ($SiO_x$), whereas the active layer 114 and the ohmic contact layer 116 may be formed of an amorphous silicon or an amorphous silicon doped with an $n^+$ or $p^+$ impurity.

Subsequently, a second photo-resist pattern 200 including photo-resist patterns 200A and 200B having a different thickness is formed on the ohmic contact layer 116 by a photolithography using a partial transmitting mask. The partial transmitting mask includes a shielding part for shielding ultraviolet light; a partial transmitting part for diffracting ultraviolet light using a slit pattern or partially transmitting the ultraviolet using a phase-shifting material; and a full transmitting part for fully transmitting ultraviolet light. The second photo-resist pattern 200 having a different thickness of photo-resist patterns 200A and 200B and an aperture part is formed by photolithography using the partial transmitting mask. In this case, a relatively thick photo-resist pattern 200A is provided at a shielding area P1 corresponding to the shielding part of the partial transmitting mask; the photo-resist pattern 200B, which is thinner than the photo-resist pattern 200A, is provided at a partial exposure area P2 corresponding to the partial transmitting part; and the aperture part is provided at an full exposure area P3 corresponding to the full transmitting part.

Figure 8B:
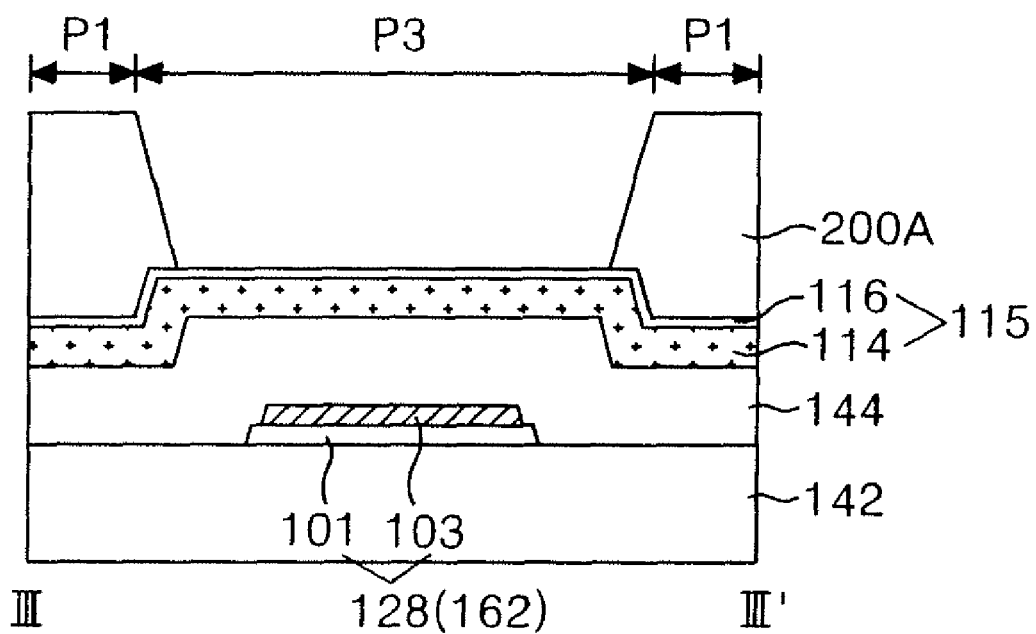
Figure 8C:
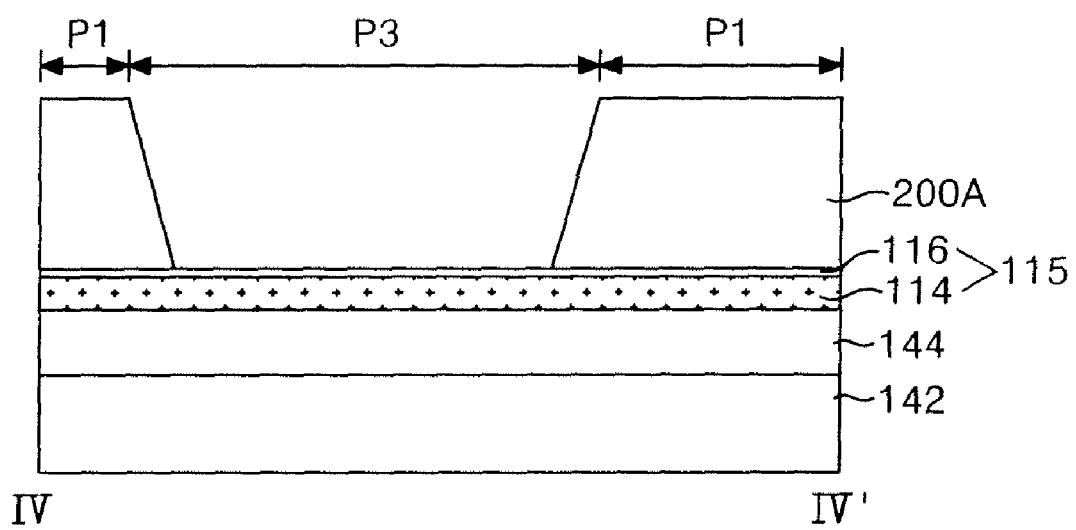
Figure 8D:
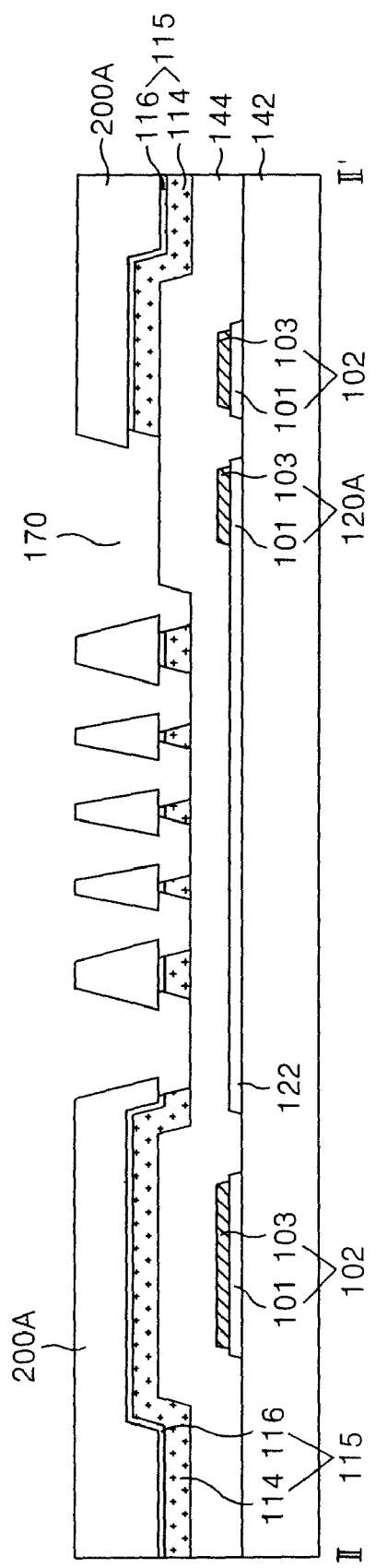

Referring to FIG. 8B, the pixel hole 170 passing through the semiconductor layer 115, and the first to third contact holes 130, 164 and 138 passing through the gate insulating film 144 are formed by an etching process using the second photo-resist pattern 200.

For example, the semiconductor layer 115 and the gate insulating film 144 exposed by the second photo-resist pattern 200 are etched by a dry etching process to thereby define the first to third contact holes 130, 164 and 138. In this case, the second photo-resist pattern 200 may be ashed by the dry etching process so that the photo-resist pattern 200A is thinned and the photo-resist pattern 200B, along with the semiconductor pattern 115 under it, is removed, thereby defining the pixel hole 170. The semiconductor pattern 115 and the gate insulating film 144 may be over-etched in comparison to the ashed photo-resist pattern 200A by an isotropic dry etching technique. In doing so, the edges of the pixel hole 170, and the first to third contact holes 130, 164 and 138 are positioned such that their edges lie beneath the lower surface of the ashed photo-resist pattern 200A.

Alternatively, the first to third contact holes 130, 164 and 138 may be formed by a dry etching process using the second photo-resist pattern 200 as a mask, and then the thickness of the photo-resist pattern 200A is reduced and the photo-resist pattern 200B is removed by the ashing process. Next, the pixel hole 170 passing through the semiconductor layer 115 is formed by the wet etching process using the ashed photo-resist pattern 200A. In this case, the etching rate of the semiconductor layer 115 is larger than that of the gate insulating film 144, so that the semiconductor layer 115 is over-etched in comparison to the ashed photo-resist pattern 200A.

Accordingly, the pixel hole 170 exposes the gate insulating film 144 overlapping on the common electrode 122; the third contact hole 138 exposes the substrate 142; and the first and second contact holes 130 and 164 respectively the lower gate and common pad electrodes 128 and 166 and the substrate 142 at their peripheries. Herein, the first and second contact holes 130 and 164 may be formed in such a manner as to expose only the lower gate and common pad electrodes 128 and 166. On the other hand, when the third contact hole 138 is formed by the partial exposure mask like the pixel hole 170, the third contact hole 138 may have a structure in which the semiconductor layer 115 is removed to expose the gate insulating film 144.

Figure 8E:
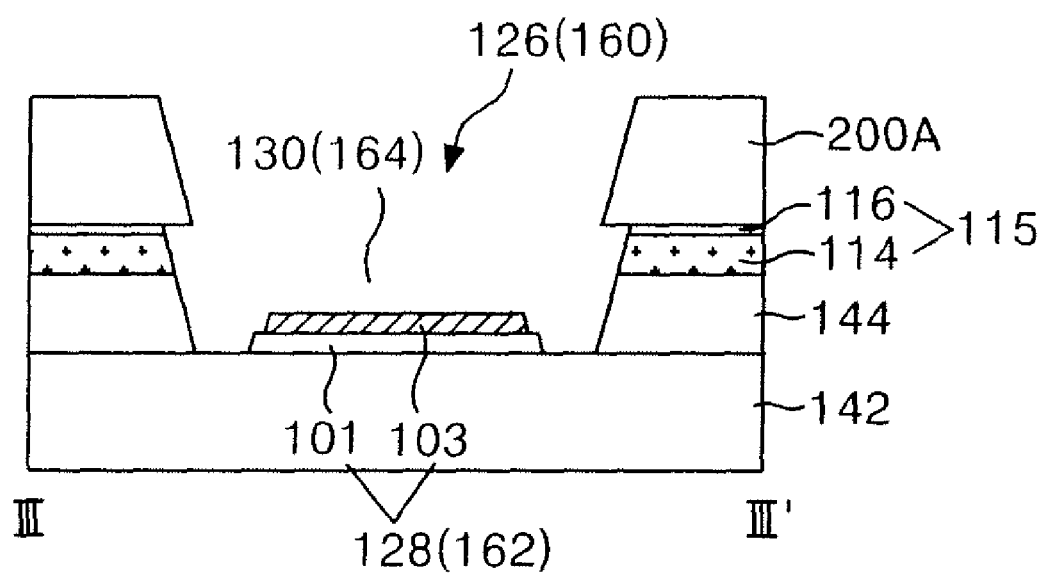

Referring to FIG. 8E, the transparent conductive layer 117 is entirely formed on the substrate 142, which has the photo-resist pattern 200A, by a deposition technique such as the sputtering. The transparent conductive layer 117 may be formed a conductive transparent material, such as from ITO, TO, IZO or ITZO. The pixel electrode 118 is formed within the pixel hole 170; the upper gate and common pad electrodes 132 and 166 are formed within the first and second contact holes 130 and 164; and the data pad 134 is formed within the third contact hole 138. The transparent conductive pattern has an opened structure, or discontinuities, resulting from its formation on photo-resist pattern 200A. The opened structure is due to the offset distance between the edges of holes 170, 130, 164 and 138, and the edge of the photo-resist pattern 200A. Further, the pixel electrode 118 may be in contact with or spaced from the semiconductor layer 115 enclosing the pixel hole 170 to be formed within the pixel hole 170. The pixel electrode 118 overlaps with the common electrode 122 and the common line 120A with the gate insulating film 144 between them. The upper gate pad electrode 132, the common pad electrode 166, and the data pad 134 are formed within the first to third contact holes 130, 164 and 138 to form an interface with the gate insulating film 144. Herein, when the second contact hole 138 is provided in such a manner as to pass through only the semiconductor layer 115 by the partial exposure, the data pad 134 is formed on the gate insulating film 144 in such a manner to be in contact with or spaced from the semiconductor layer 115, as illustrated in FIG. 8G. Accordingly, a stripper infiltration between the photo-resist pattern 200A and the ohmic contact layer 116 facilitates the lift-off process used to remove the photo-resist pattern 200A coated with the transparent conductive film 117, thereby improving the efficiency of the lift-off process.

Figure 8F:
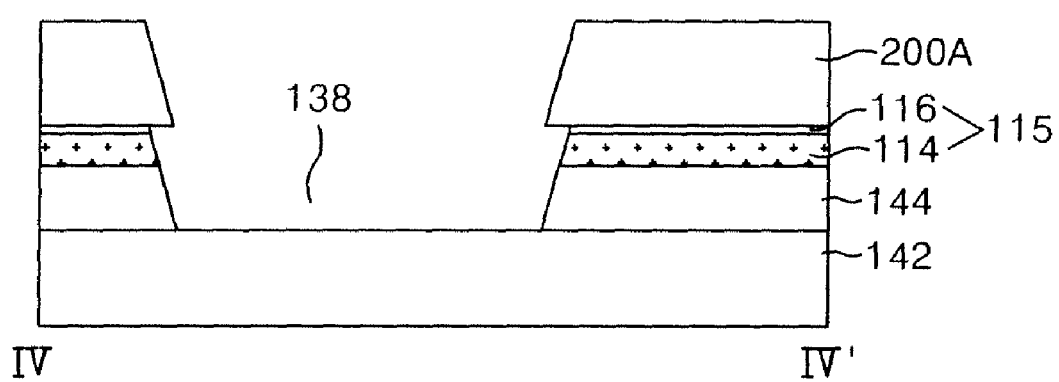
Figure 8H:
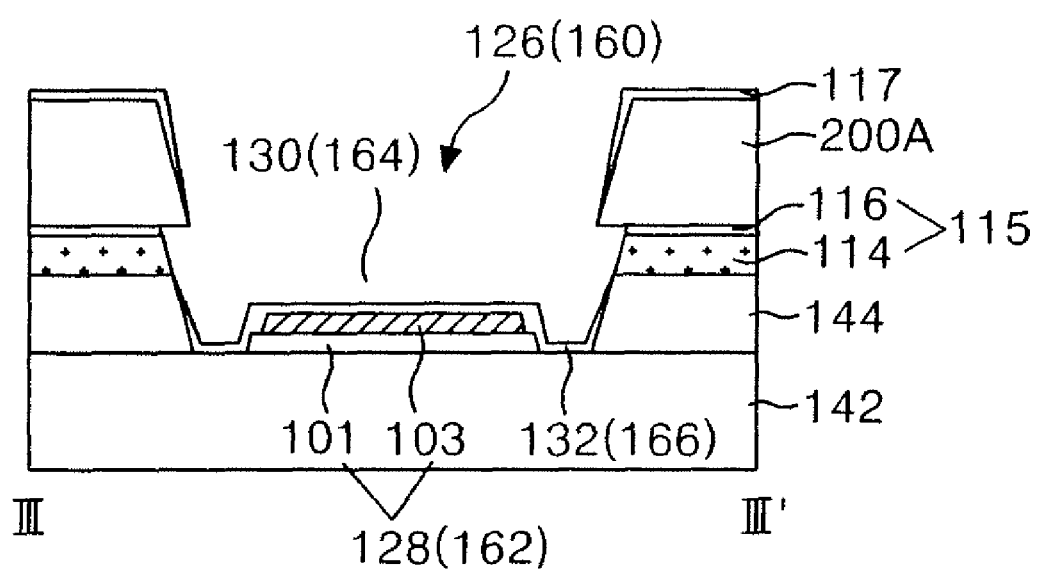
Figure 8I:
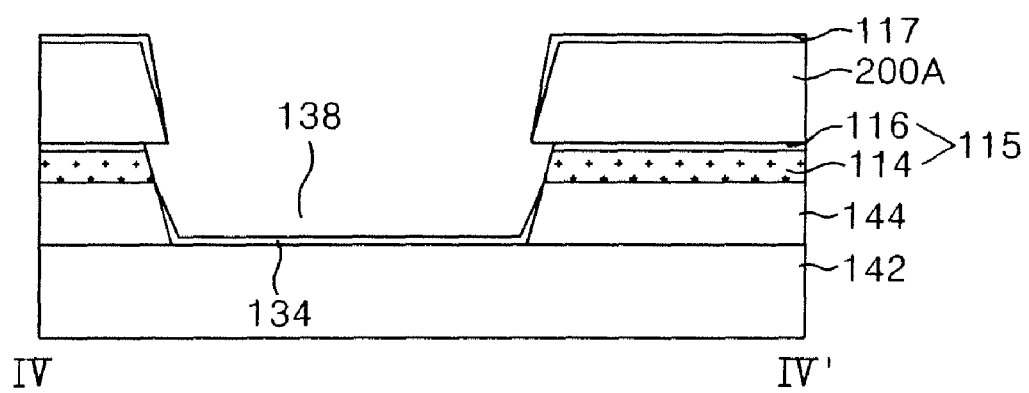
Figure 8J:
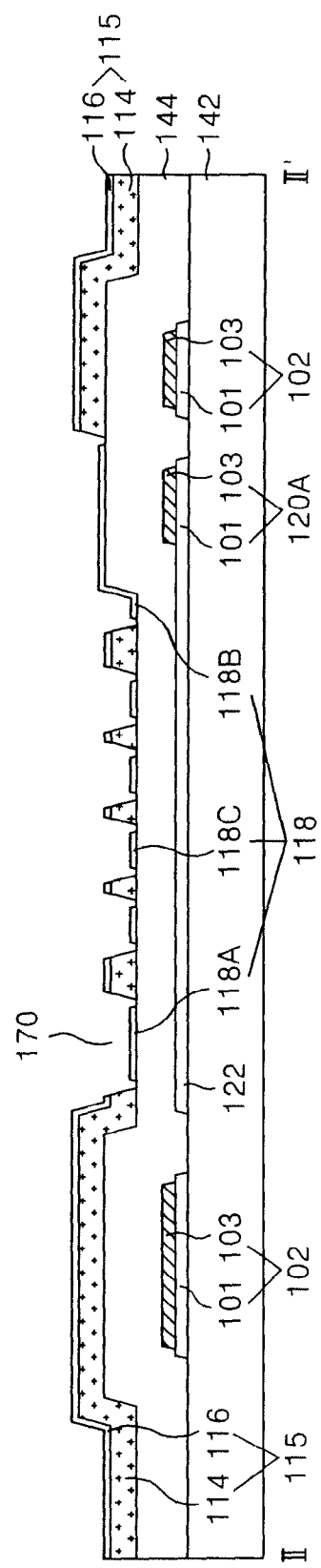
Figure 8K:
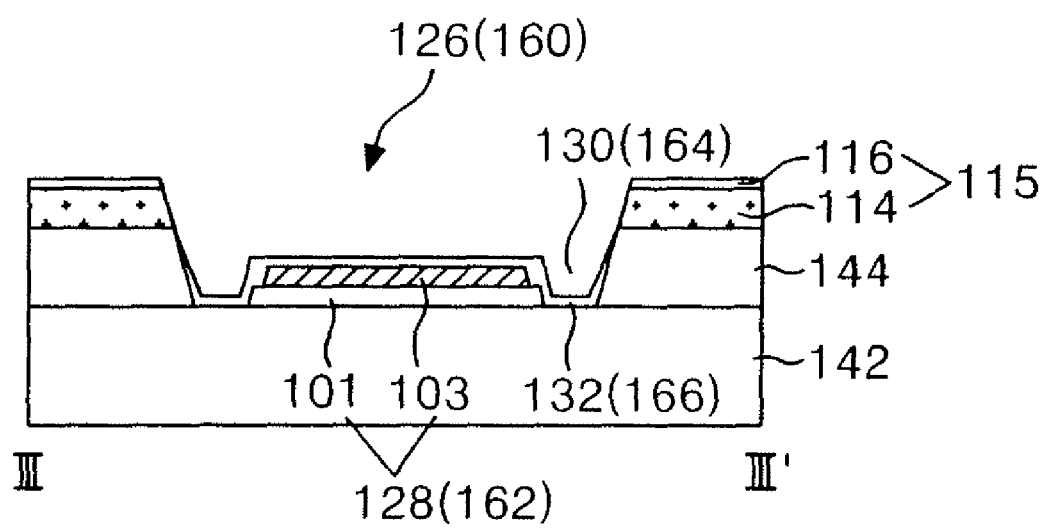
Figure 8L:
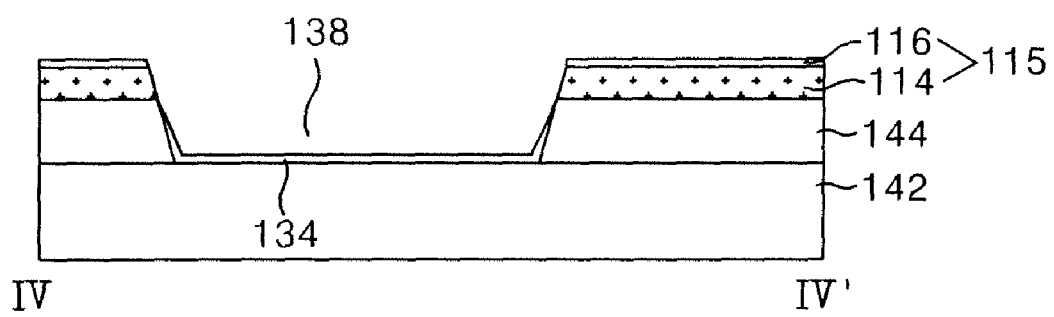

Referring to FIGS. 8H-8J, the photo-resist pattern 200A coated with the transparent conductive film 117 illustrated in FIGS. 8E-8G is removed by the lift-off process.

Figure 9A:
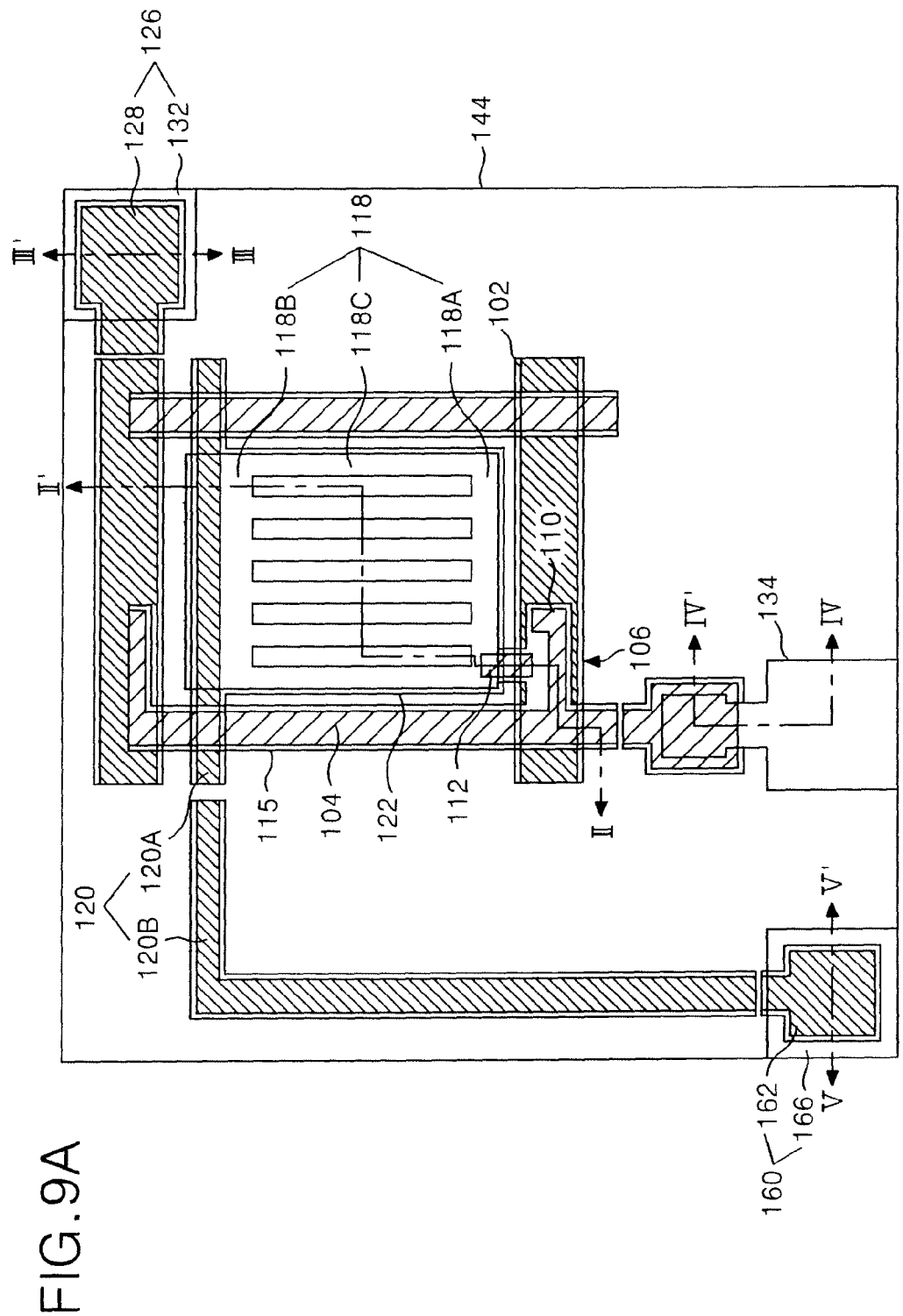
FIG. 9A is a plan view illustrating a third mask process in a method of fabricating the thin film transistor substrate of fringe field switching type according to the embodiment of the present invention.
Figure 9C:
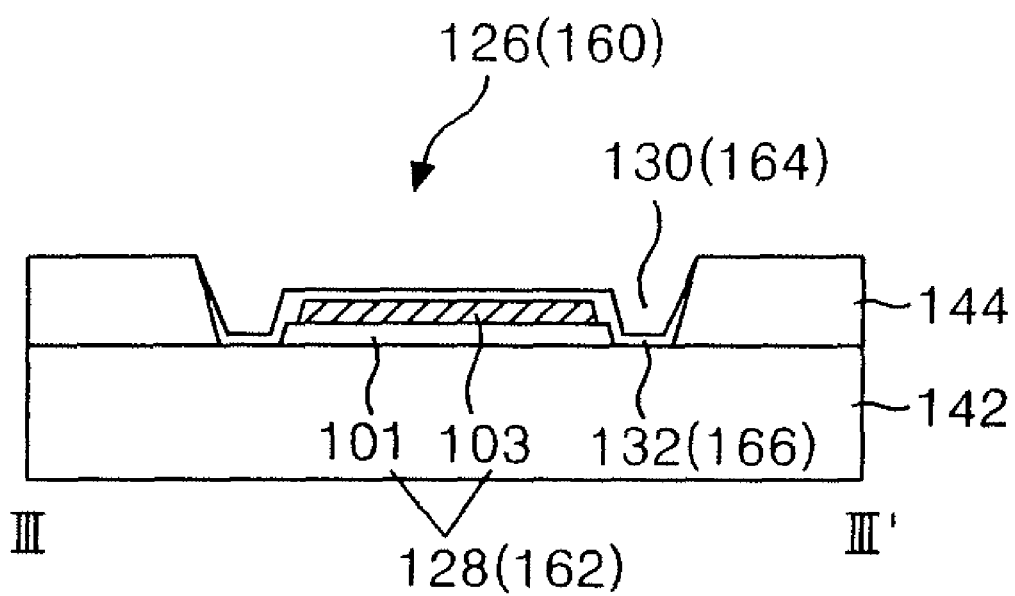
Figure 9D:
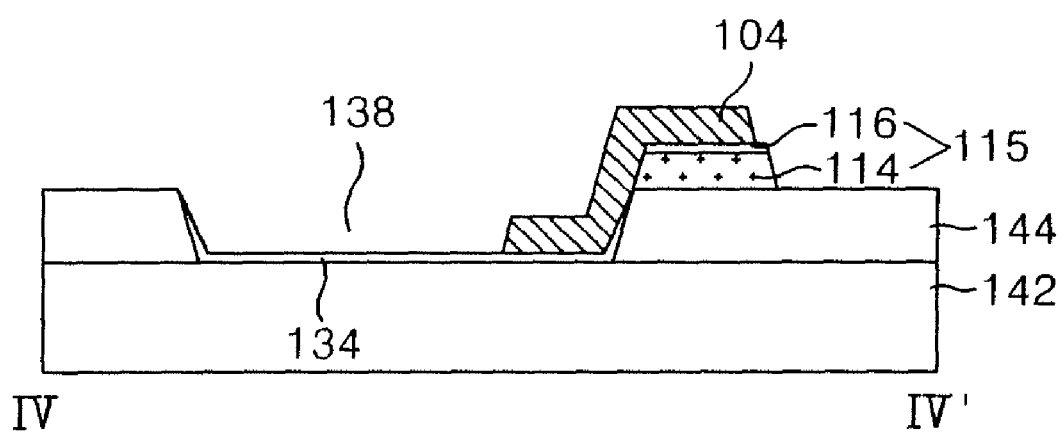

FIG. 9A is plan view and FIGS. 9B-9D are sectional views illustrating a third mask process in an exemplary method of fabricating the FFS-type thin film transistor substrate according to an embodiment of the present invention. FIGS. 10A-10L are sectional views further illustrating the third mask process.

A source/drain metal pattern including the data line 104, the source electrode 110 and the drain electrode 112 is formed on the lower substrate 142, which has the semiconductor layer 115 and the transparent conductive pattern already formed. The semiconductor layer 115 non-overlapped with the source/drain metal pattern is removed, and the active layer 114 between the source electrode 110 and the drain electrode 112 is exposed, thereby defining a channel of the thin film transistor 106. The source/drain metal pattern and the channel of the thin film transistor 106 are formed by a single mask process employing a partial transmitting mask such as a diffractive exposure mask or a half tone mask.

Figure 10A:
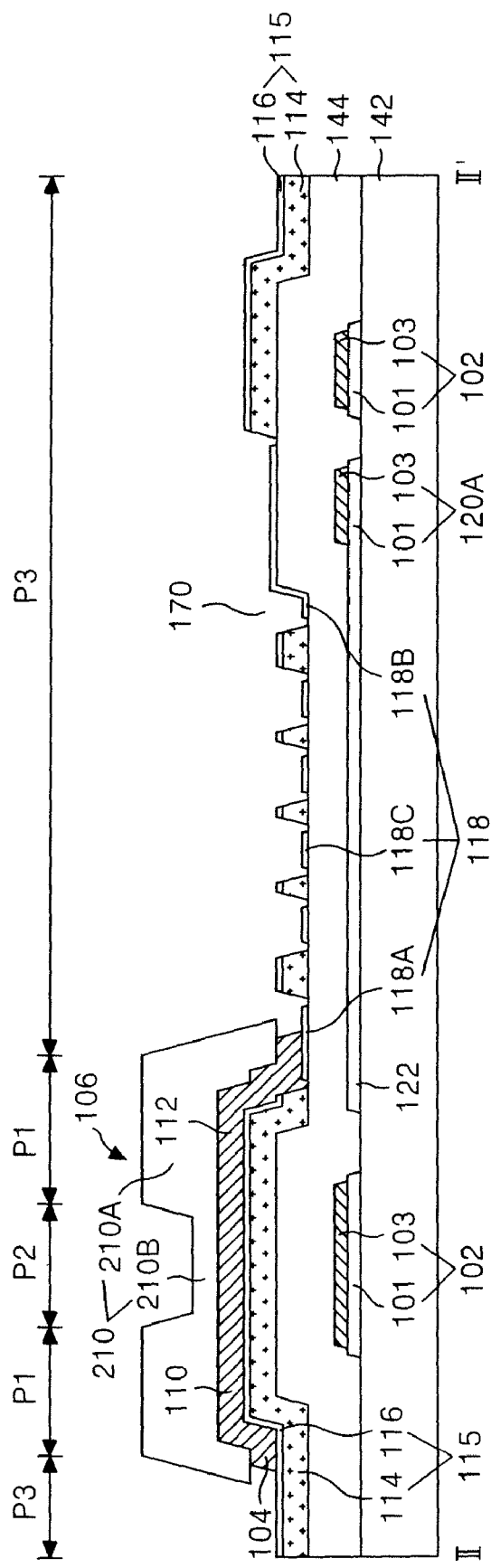
Figure 10B:
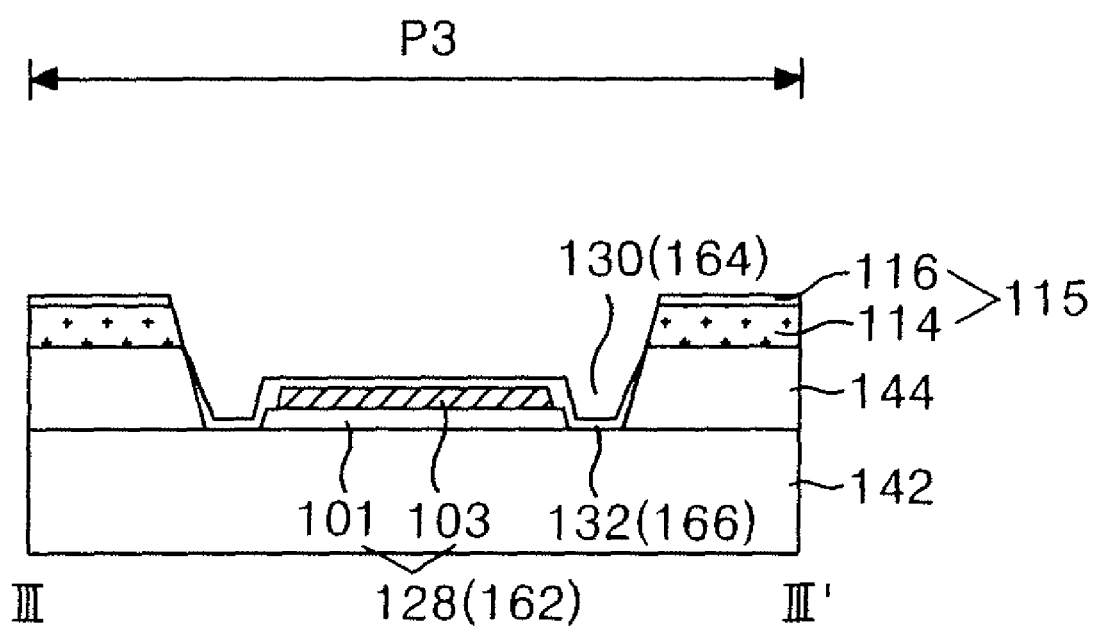

Referring to FIG. 10A, a source/drain metal layer is formed on the lower substrate 142, which has the semiconductor layer 115 and the transparent conductive pattern, by a deposition technique such as the sputtering. The source/drain metal layer may have a single layer formed of a metal material such as Mo, Ti, Cu, AlNd, Al, Cr, a Mo alloy, a Cu alloy or an Al alloy, or the source/drain metal layer may have a layered structure with at least double layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo alloy, Mo-alloy/Al, Al-alloy/Mo-alloy, Mo-alloy/Al-alloy, Mo/Al alloy, Cu/Mo alloy or Cu/Mo(Ti), etc.

Subsequently, a third photo-resist pattern 210 including photo-resist patterns 210A and 210B having different thicknesses is formed on the source/drain metal layer by the photolithography using the partial transmitting mask. The partial transmitting mask includes a shielding part for shielding ultraviolet light, a partial transmitting part for diffracting ultraviolet light using a slit pattern or partially transmitting ultraviolet light using a phase-shifting material; and a full transmitting part for fully transmitting ultraviolet light. A third photo-resist pattern 210, which includes photo-resist patterns 210A and 210B and an aperture part, is formed by photolithography using the partial transmitting mask. In this case, a relatively thick photo-resist pattern 210A is provided at a shielding area P1 corresponding to the shielding part of the partial transmitting mask; the photo-resist pattern 210B, which is thinner than the photo-resist pattern 210A, is provided at a partial exposure area P2 corresponding to the partial transmitting part, that is, at an area to be provided with the channel; and the aperture part at exposure area P3, which corresponds to the full transmitting part.

Figure 10C:
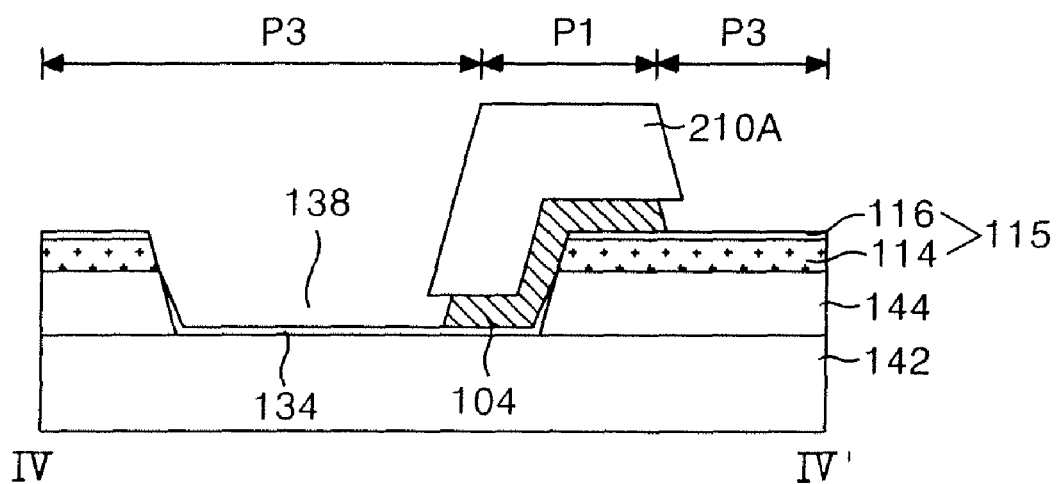

Further, the source/drain metal layer is patterned by the etching process using the third photo-resist pattern 210 as a mask to thereby provide the source/drain metal pattern including the data line 104 and the drain electrode 112, which at this stage are integral to the source electrode 110. For instance, the source/drain metal layer may be patterned by a wet etching process so that the source/drain metal pattern has an over-etched structure in comparison to the third photo-resist pattern 210. The drain electrode 112 of the source/drain metal pattern protrudes from the overlapping portion between it and the semiconductor layer 115 to be connected to the pixel electrode 118. The data line 104 is connected to the pixel electrode 118 in such a manner as to overlap with the data pad 134 provided within the third contact hole 138, as illustrated in FIGS. 10A and 10C.

Figure 10D:
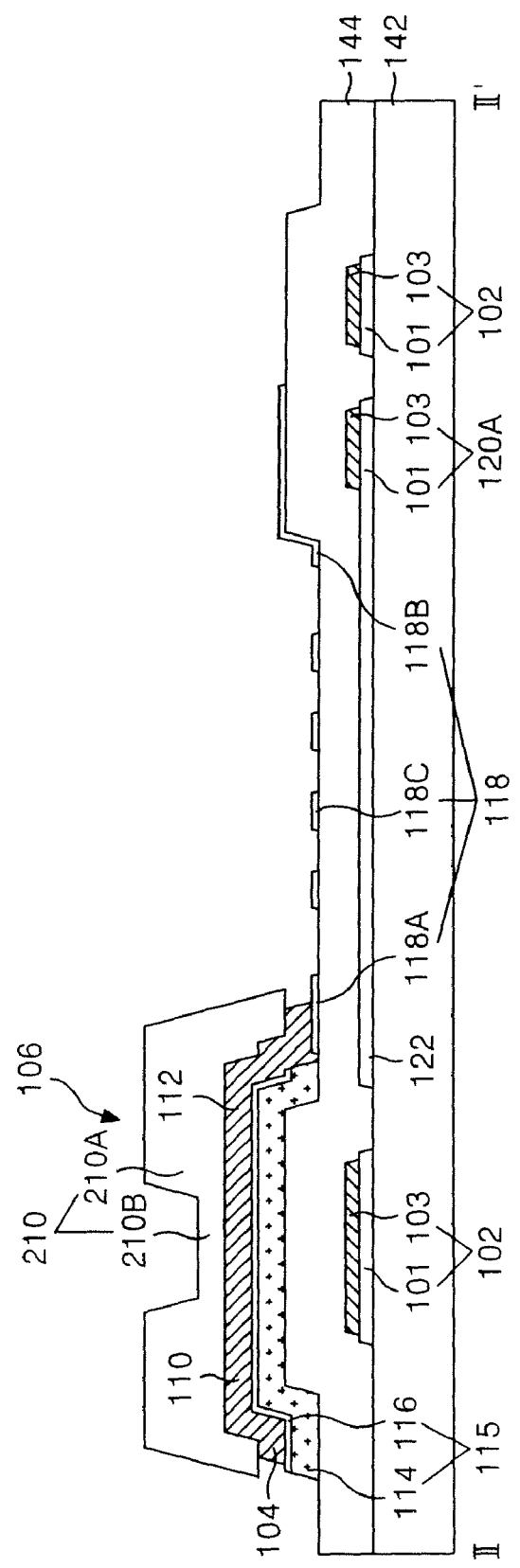
Figure 10E:
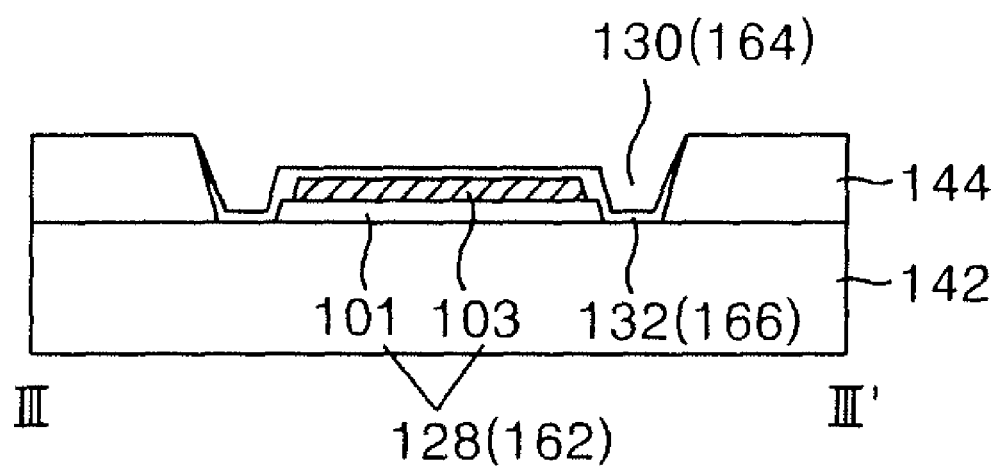
Figure 10F:
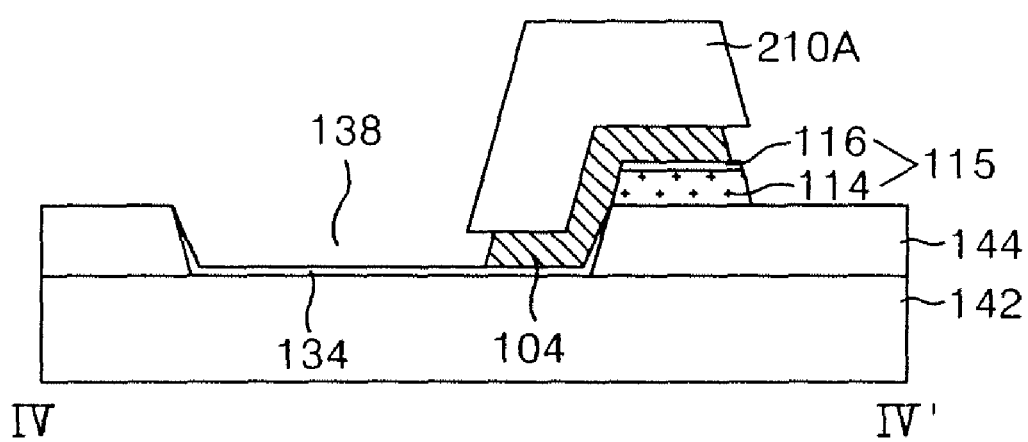
Figure 10G:
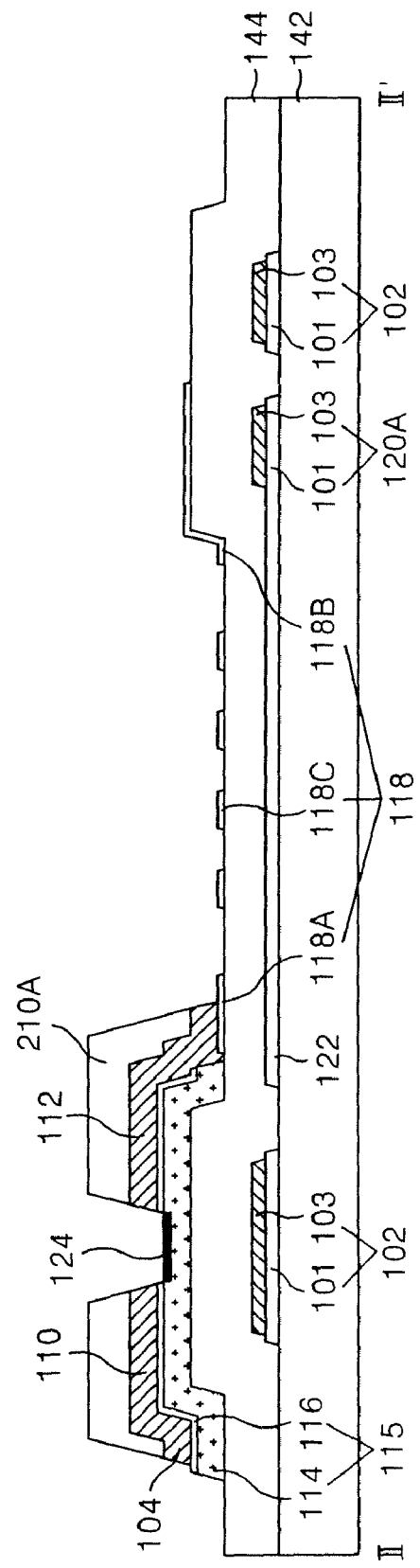
Figure 10H:
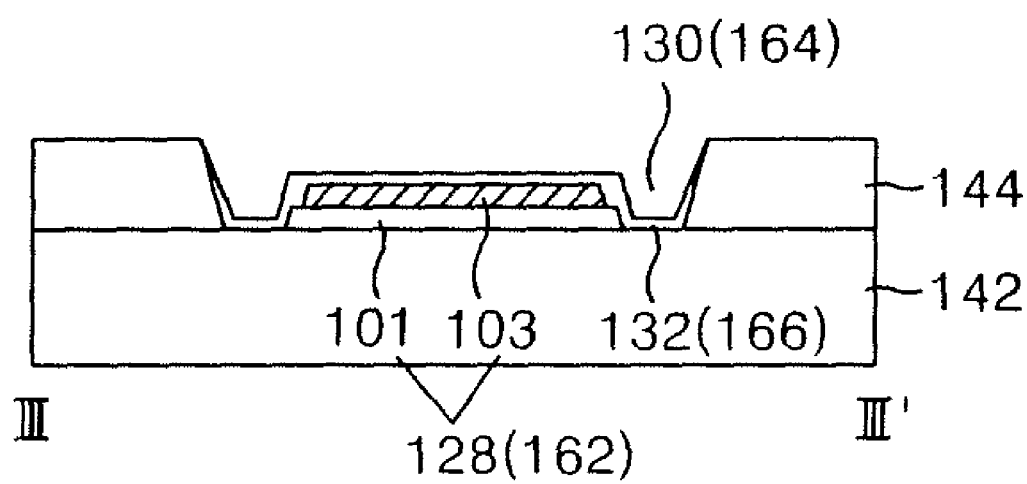
Figure 10I:
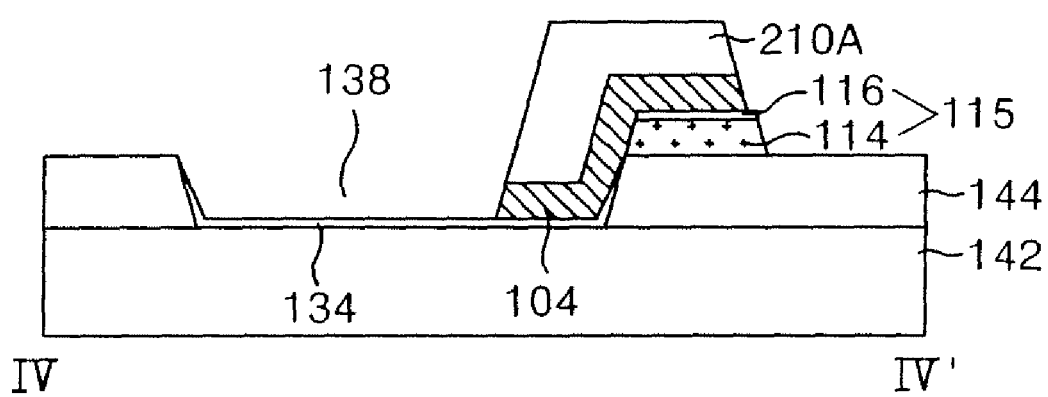

Referring to FIG. 10D-10F, the semiconductor layer 115 exposed through the third photo-resist pattern 210 is etched, so that the semiconductor layer 115 exists only in the overlapping portion between it and the second photo-resist pattern 210. For instance, the exposed semiconductor layer 115 may be etched by a dry etching process having linearity using utilizing the third photo-resist pattern 210 as a mask. Thus, the semiconductor layer 115 exists only in the overlapping portion between it and the third photo-resist pattern 210 used to form the source/drain metal pattern, and has a structure in which the edge of the semiconductor layer 115 protrudes further than that of the source/drain metal pattern. As a result, the source/drain metal pattern and the semiconductor layer 115 have a step coverage in a stepwise shape, such that the semiconductor layer 115 has a slightly larger area than the source/drain metal pattern. Referring to FIGS. 10G-10I, the photo-resist pattern 210A is thinned, and the photo-resist pattern 210B illustrated in FIG. 10D is removed by an ashing process using an oxygen ($O_2$) plasma. Such an ashing process may be incorporated with a dry etching process for etching the exposed semiconductor layer 115 and performed within the same chamber. Next, the exposed source/drain metal pattern and the ohmic contact layer 116 are removed by the etching process using the ashed photo-resist pattern 210A. Accordingly, the source electrode 110 and the drain electrode 112 are disconnected from each other, and the thin film transistor 106 having the channel for exposing the active layer 114 between them is completed.

Further, the surface of the active layer 114 exposed by the surface treatment process using an oxygen ($O_2$) plasma is oxidized by $SiO_2$, forming surface layer 128. Thus, the active layer 114 defining the channel of the thin film transistor 106 can be protected by the surface layer 124 oxidized by $SiO_2$.

Figure 10K:
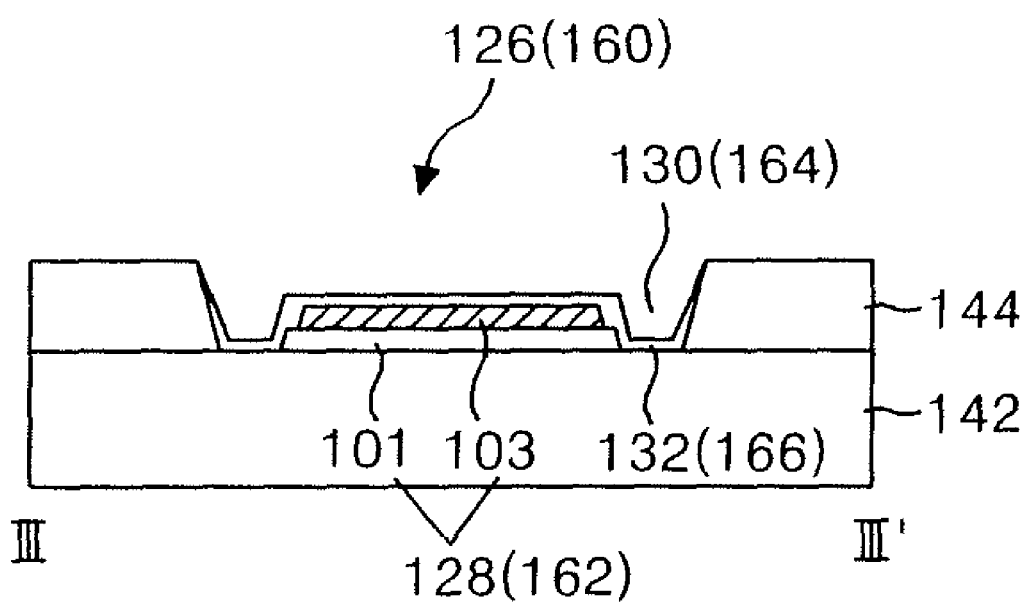
Figure 10L:
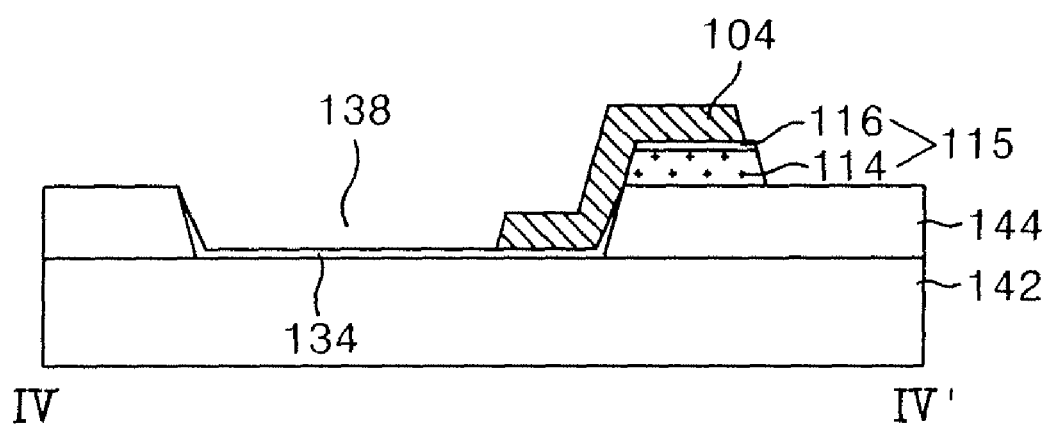

Referring to FIGS. 10J-10L, the photo-resist pattern 210A illustrated in FIGS. 10G-10I is removed by the stripping process.

As described above, the method of fabricating the FFS-type thin film transistor substrate according to the first embodiment of the present invention can reduce the number of processes by using the exemplary three-round mask process.

Figure 11:
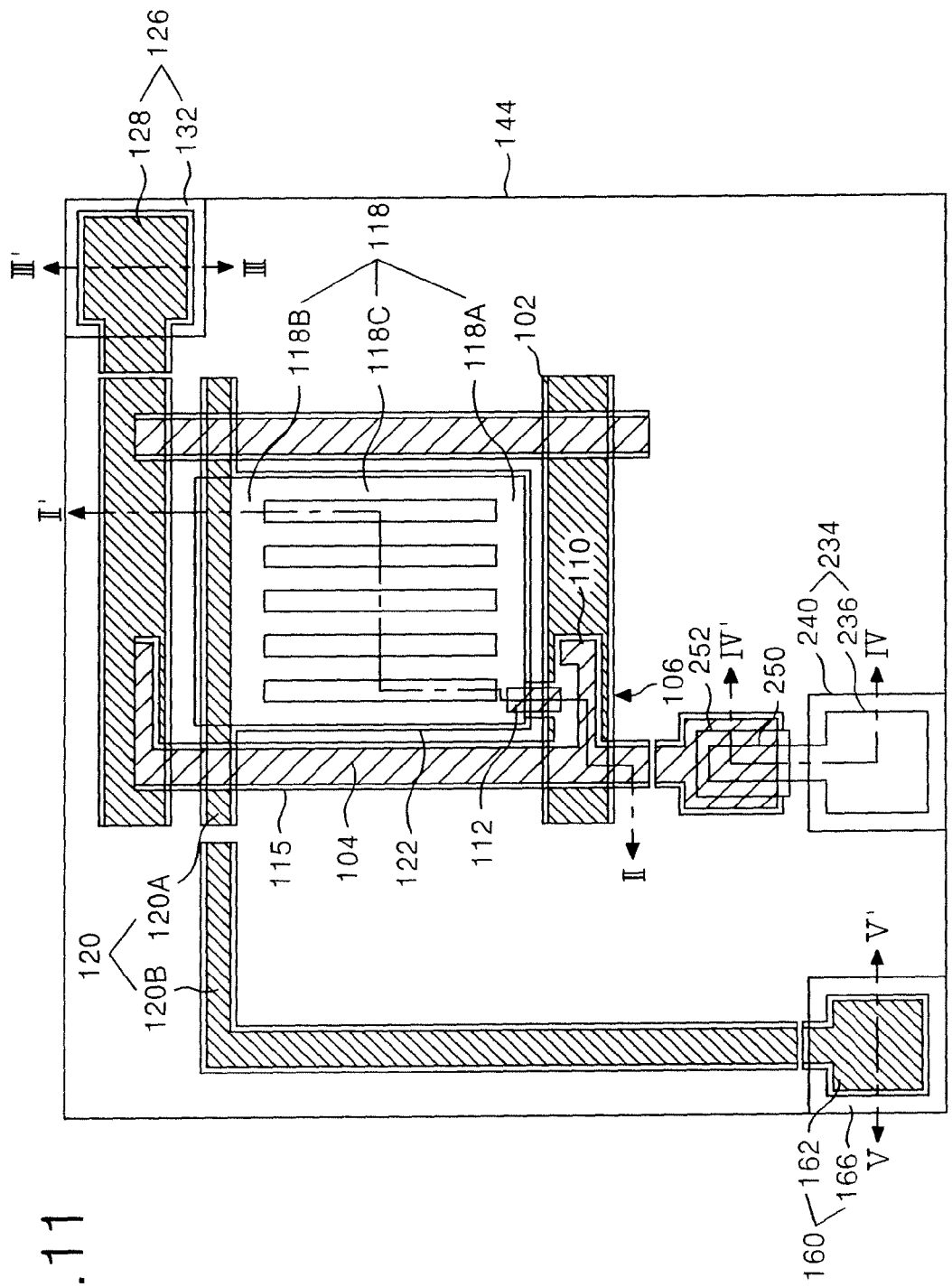
FIG. 11 is a plan view illustrating a portion of a thin film transistor substrate of fringe field switching type according to a second embodiment of the present invention.
Figure 12A:
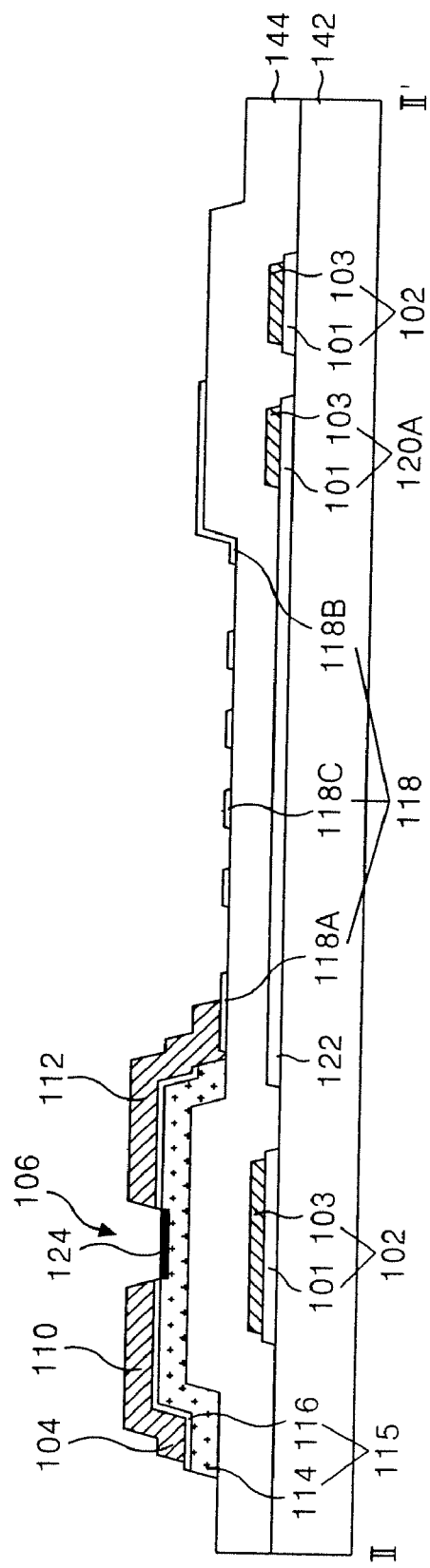
FIGS. 12A through 12C are sectional views of the thin film transistor substrate taken along the II-II', III-III' and IV-IV' lines in FIG. 11.
Figure 12B:
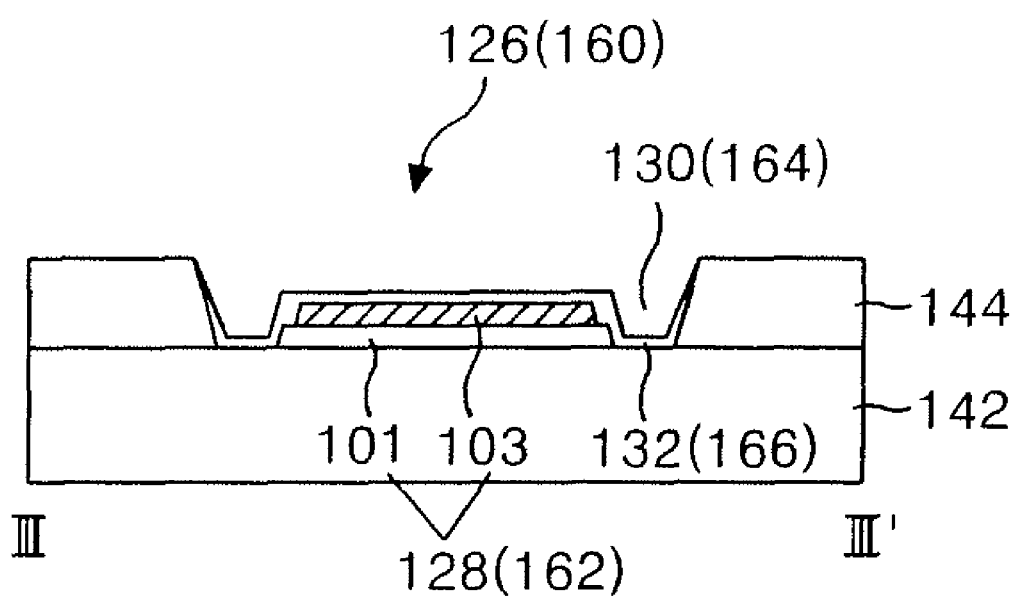
Figure 12C:
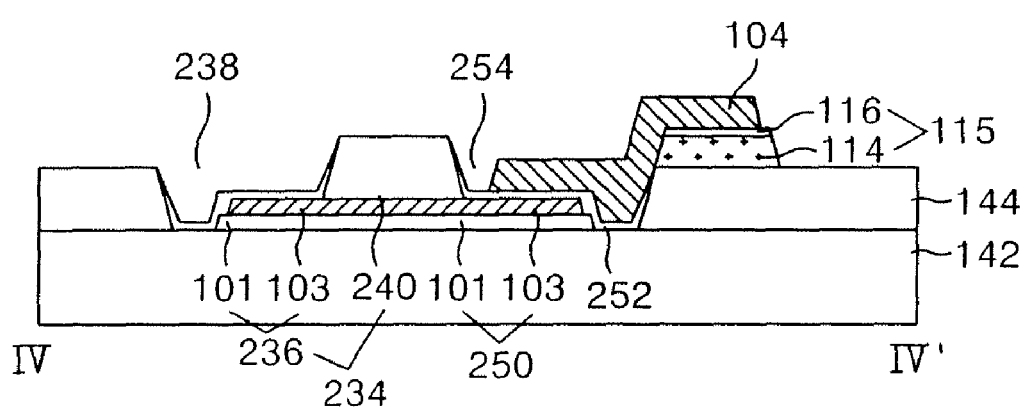

FIG. 11 is a plan view illustrating a portion of a FFS-type thin film transistor substrate according to a second embodiment of the present invention, and FIGS. 12A-12C are sectional views of the thin film transistor substrate respectively taken along the II-II', III-III' and IV-IV' lines in FIG. 11.

The thin film transistor substrate illustrated in FIG. 11 and FIG. 12A-12C has substantially similar elements as the thin film transistor substrate illustrated in FIGS. 2 and 3A-3D, except that a data pad 234 has a vertical structure substantially identical to the gate pad 126. The data pad 234 further includes a contact electrode 252 for connecting a data link 250 extended from the data pad 234 to the data line 104. Therefore, an explanation regarding the substantially similar elements will be omitted.

Referring to FIG. 11 and FIGS. 12A-12C, the data pad 234 includes a lower data pad electrode 236 disposed on the substrate 142, and an upper data pad electrode 240 disposed within a third contact hole 238 passing through the gate insulating film 144 to expose the lower data pad electrode 236 so that it can be connected to the lower data pad electrode 236 in a manner similar to that of the gate pad 126.

The data link 250 is extended from the lower electrode 236 of the data pad 234 in such a manner as to overlap with the data line 104 and is exposed through a fourth contact hole 254 passing through the gate insulating film 144. The data link 250 is connected, via the contact electrode 252 provided within the fourth contact hole 254, to the data line 104.

Herein, the lower data pad electrode 236 and the data link 250, along with the lower gate pad electrode 128, are formed in the first mask process. The third and fourth contact holes 238 and 254, along with the first contact hole 130, are formed by the second mask process. In the second mask process, the upper data pad electrode 240 and the contact electrode 252, along with the upper gate pad electrode 132, are formed within the third and fourth contact holes 238 and 254, respectively. In this case, the upper data pad electrode 240 and the contact electrode 252 form an interface with the edge of the gate insulating film 144 enclosing the second and third contact holes 238 and 254.

Further, the data line 104 is positioned within an area sealed by the sealant so that it can be protected by the alignment film coated on it or the liquid crystal formed in the sealed area. To this end, the contact electrode 252 for connecting the data line 104 to the data link 250 is located within the sealed area.

Figure 13:
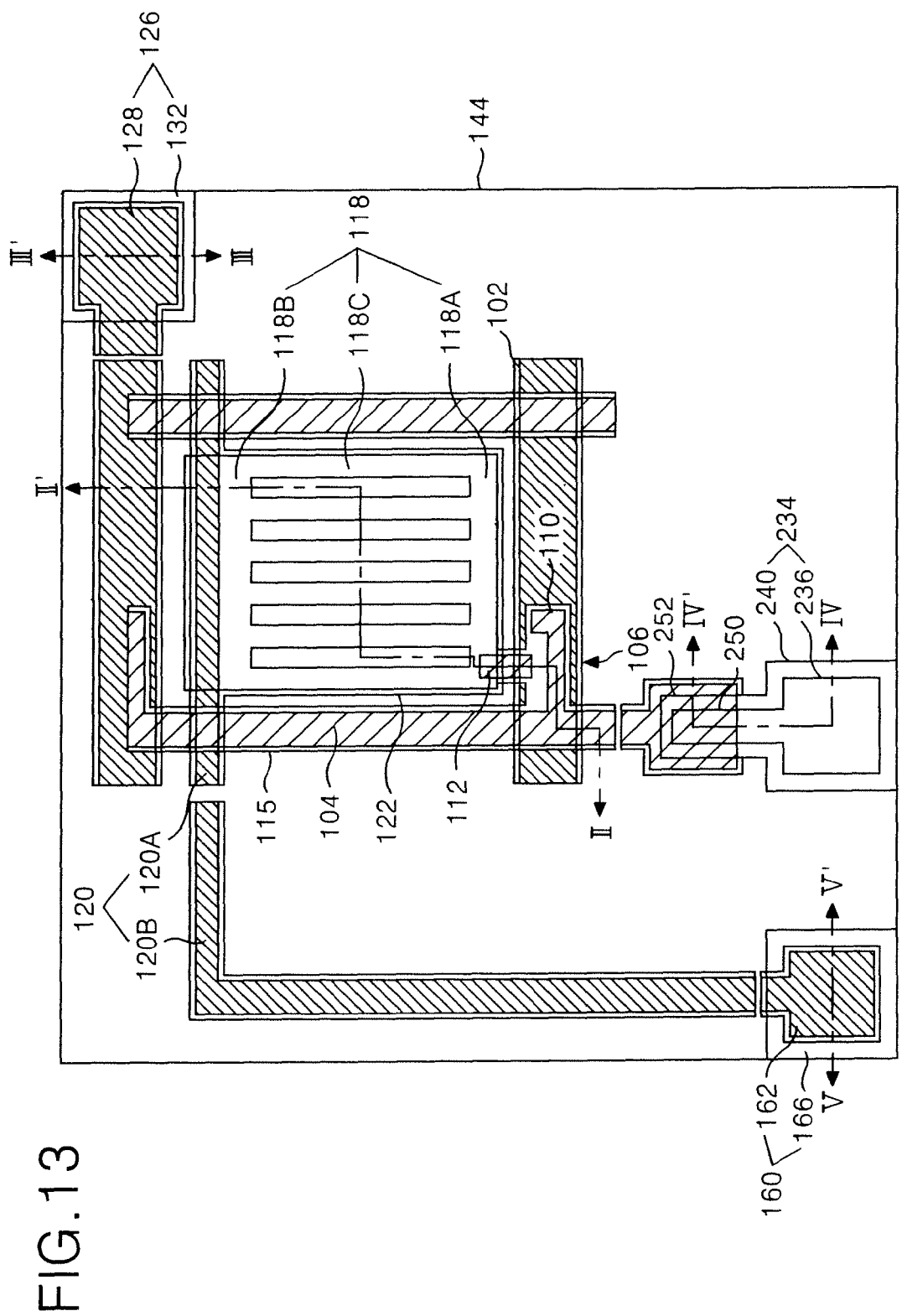
FIG. 13 is a plan view illustrating a portion of a thin film transistor substrate of fringe field switching type according to a third embodiment of the present invention.
Figure 14A:
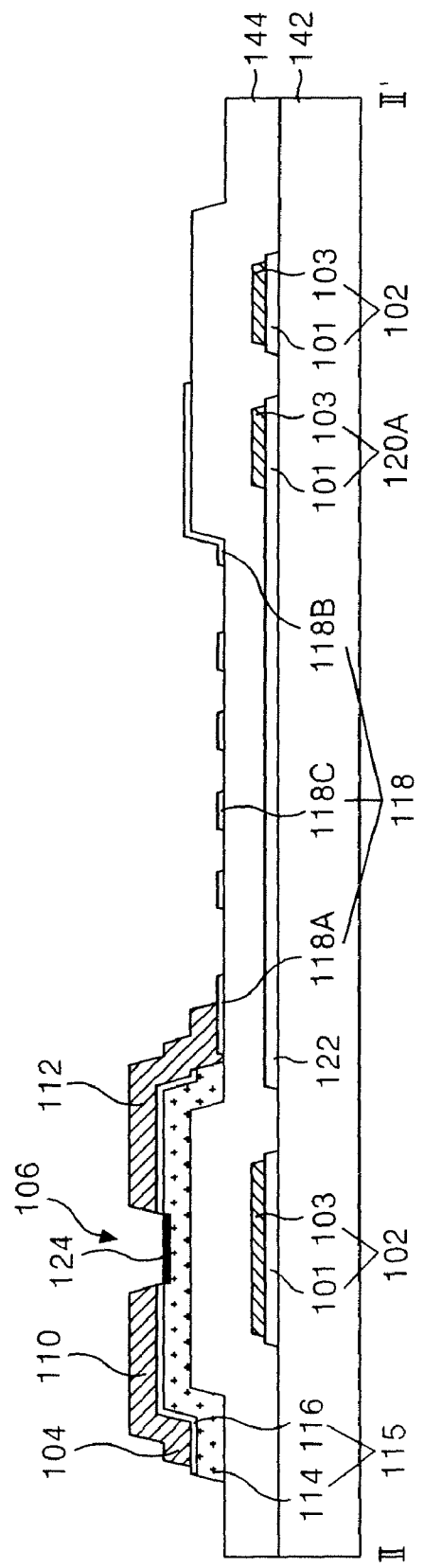
FIGS. 14A through 14C are sectional views of the thin film transistor substrate taken along the II-II', III-III' and IV-IV' lines in FIG. 13.
Figure 14B:
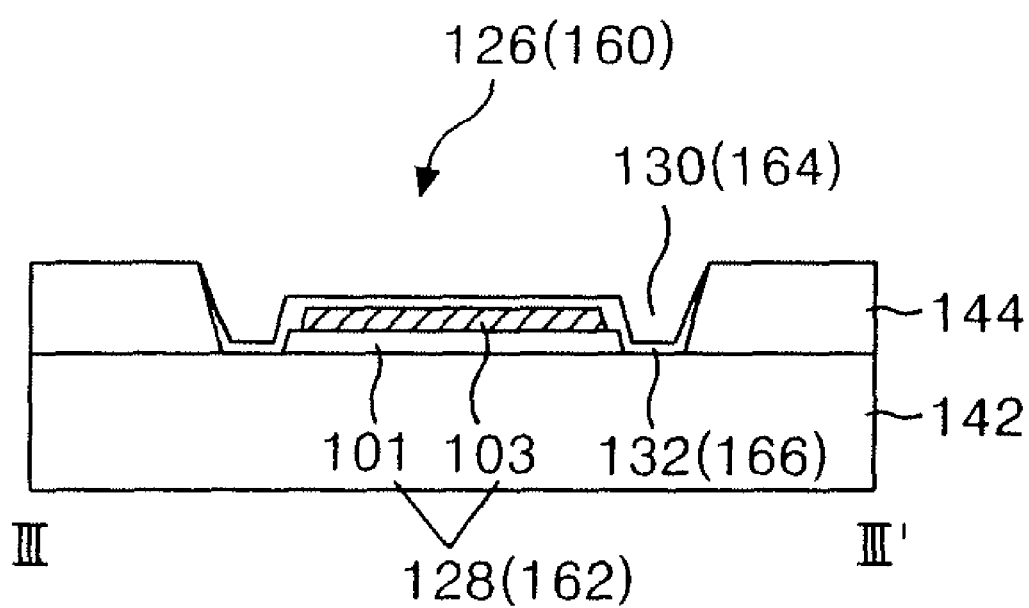
Figure 14C:
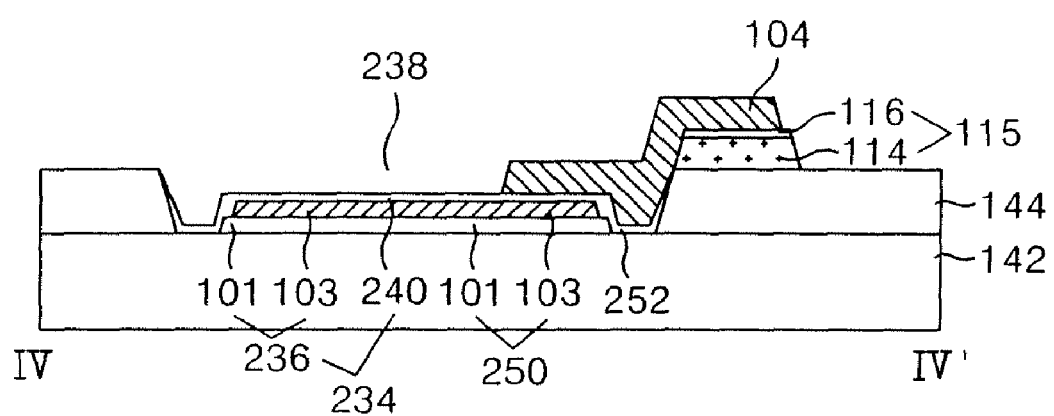

FIG. 13 is a plan view illustrating a portion of a FFS-type thin film transistor substrate according to a third embodiment of the present invention, and FIGS. 14A-14C are sectional views of the thin film transistor substrate respectively taken along the II-II', III-III' and IV-IV' lines in FIG. 13.

The thin film transistor substrate illustrated in FIGS. 13 and 14A-14C has substantially similar elements as the thin film transistor substrate illustrated in FIGS. 11 and 12A-12C, except that the upper data pad electrode 240 is integral to the contact electrode 252 within the third contact hole 238 extended along the data link 250. Accordingly, an explanation regarding similar elements will be omitted.

Referring to FIGS. 13 and 14A-14C, the third contact hole 238 of the data pad 234 is extended along the data link 250 in such a manner as to overlap with the data line 104. Thus, the upper data pad electrode 240 and the contact electrode 252 are formed in an integral structure within the second contact hole 238 to be connected to the data line 104. The upper data pad electrode 240 and the contact electrode 252 form an interface with the edge of the gate insulating film 144 enclosing the third contact hole 238.

Figure 15:
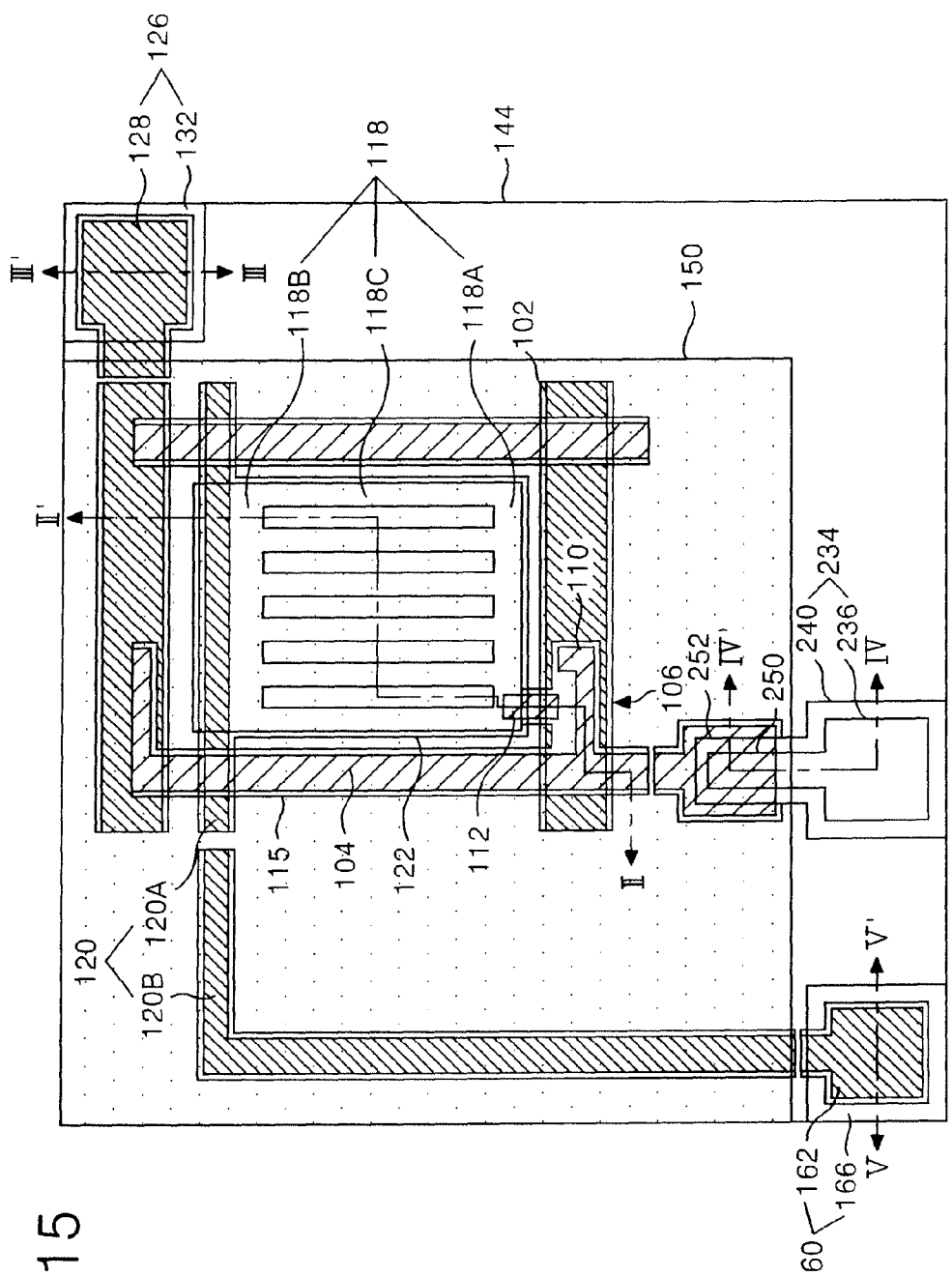
FIG. 15 is a plan view illustrating a portion of a thin film transistor substrate of fringe field switching type according to a fourth embodiment of the present invention.
Figure 16A:
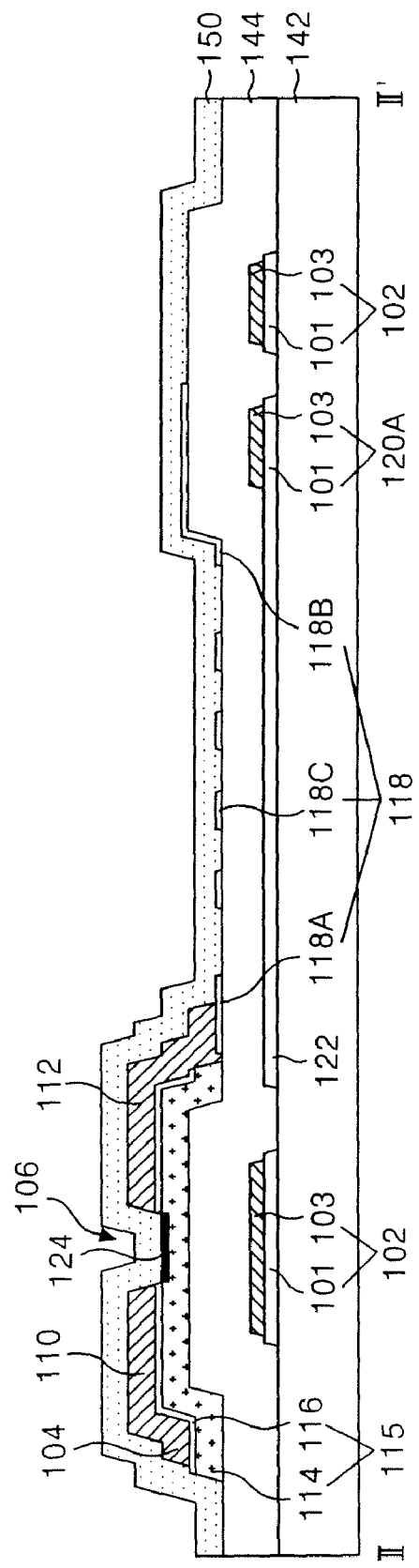
FIGS. 16A through 16C are sectional views of the thin film transistor substrate taken along the II-II', III-III' and IV-IV' lines in FIG. 15.
Figure 16B:
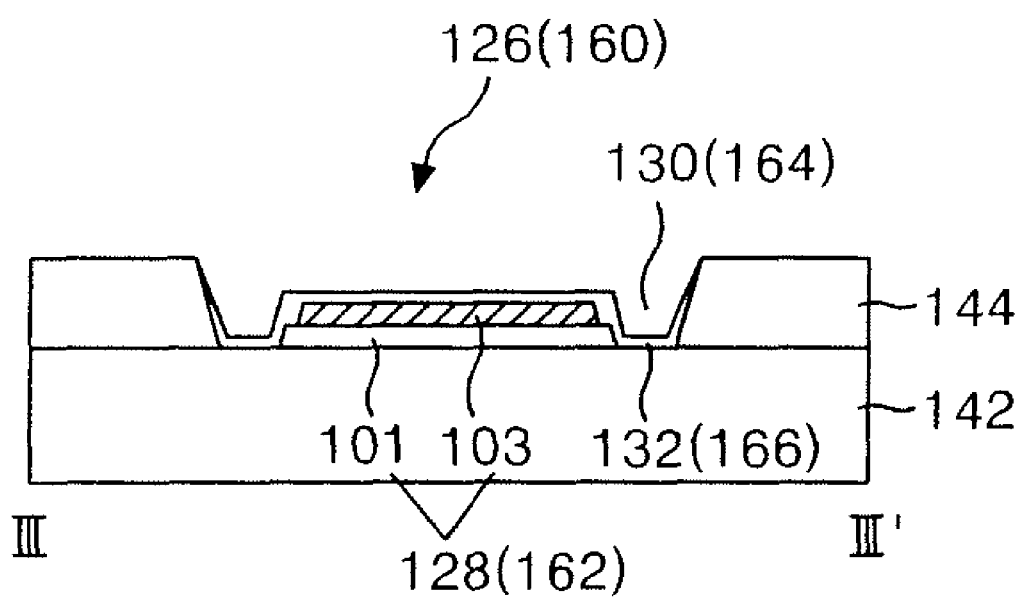
Figure 16C:
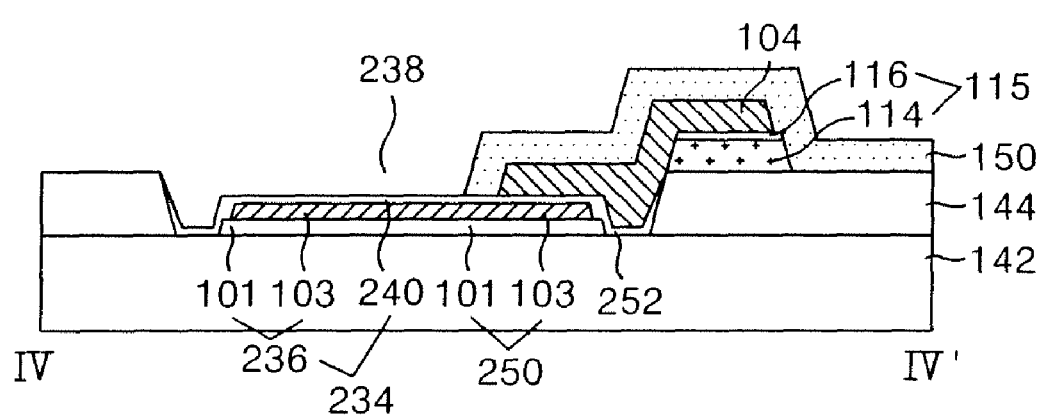

FIG. 15 is a plan view illustrating a portion of a FFS-type thin film transistor substrate according to a fourth embodiment of the present invention, and FIGS. 16A-16C are sectional views of the thin film transistor substrate respectively taken along the II-II', III-III' and IV-IV' lines in FIG. 15.

The thin film transistor substrate illustrated in FIGS. 15 and 16A-16C has substantially similar elements as the thin film transistor substrate illustrated in FIGS. 13 sand 14A-14C, except that it further includes a protective film 150 provided at the remaining array area other than a pad area at which the gate pad 126 and a data pad 234 are positioned. Therefore, an explanation regarding similar elements will be omitted.

Referring to FIGS. 15 and 16A-16C, the protective film 150 is formed on the substrate 142 with the source/drain metal pattern in such a manner as to be opened at the pad area where the gate pad 126 and the data pad 134 are provided. The protective film 150 is formed from an inorganic insulating film like the gate insulating film 144. Alternatively, the protective film 150 may be formed of an acrylic organic compound, BCB (benzocyclobutene) or PFCB (perfluorocyclobutane), etc.

The protective film 150 may be formed in the fourth mask process, or by a rubber stamp printing system like that used to form the alignment film into the uppermost layer. Further, the protective film 150 may be entirely formed on the substrate 142 and then opened at the pad area by the etching process using the alignment film as a mask, or by the etching process using the color filter substrate as a mask after joining the substrate 142 to the color filter substrate.

If fourth mask process is used, the protective film 150 is entirely formed on the substrate 142 provided with the source/drain metal pattern. In this case, the protective film 150 is formed by a PECVD process, a, spin coating or a spinless coating, etc. Further, the protective film 150 is patterned by the photolithography and the etching process using a fourth mask to be opened at the pad area.

Alternatively, the protective film 150 may be printed only at the remaining array area other than the pad area by a rubber stamp printing technique that includes a method of forming the alignment film to be provided thereon, and is thereby opened at the pad area. In other words, the protective film 150 may be formed by aligning a rubber mask on the substrate 142 provided with the source/drain metal pattern and then printing an insulating material only at an array area other than the pad area by the rubber stamp printing technique.

Figure 17A:
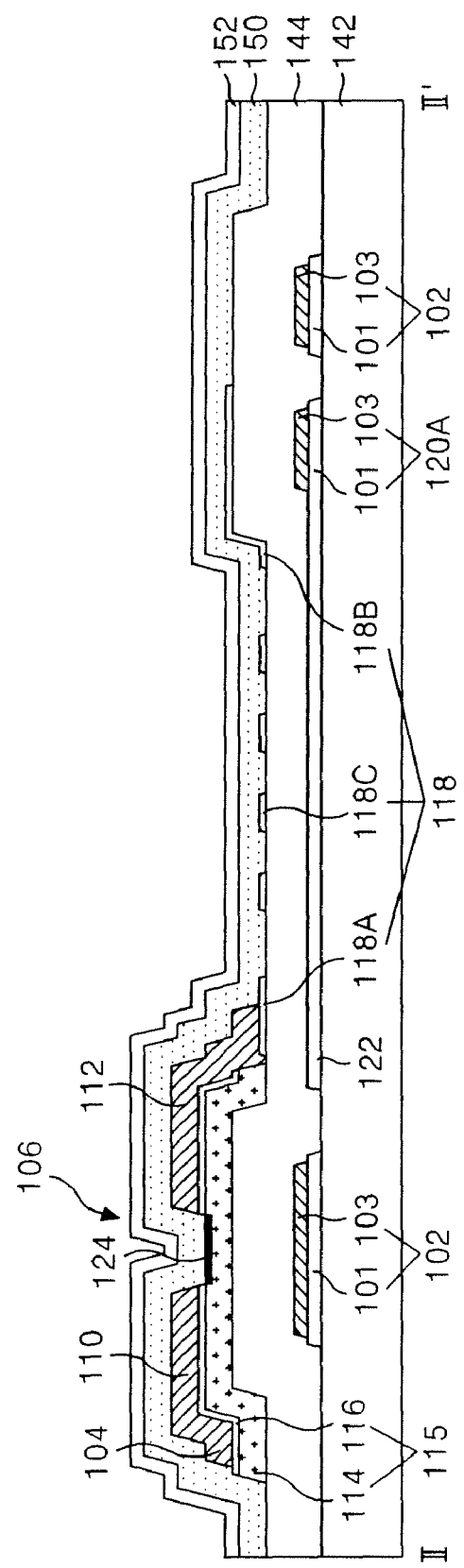
FIGS. 17A through 17F are sectional views illustrating a method of fabricating a protective film according to another embodiment of the present invention.
Figure 17B:
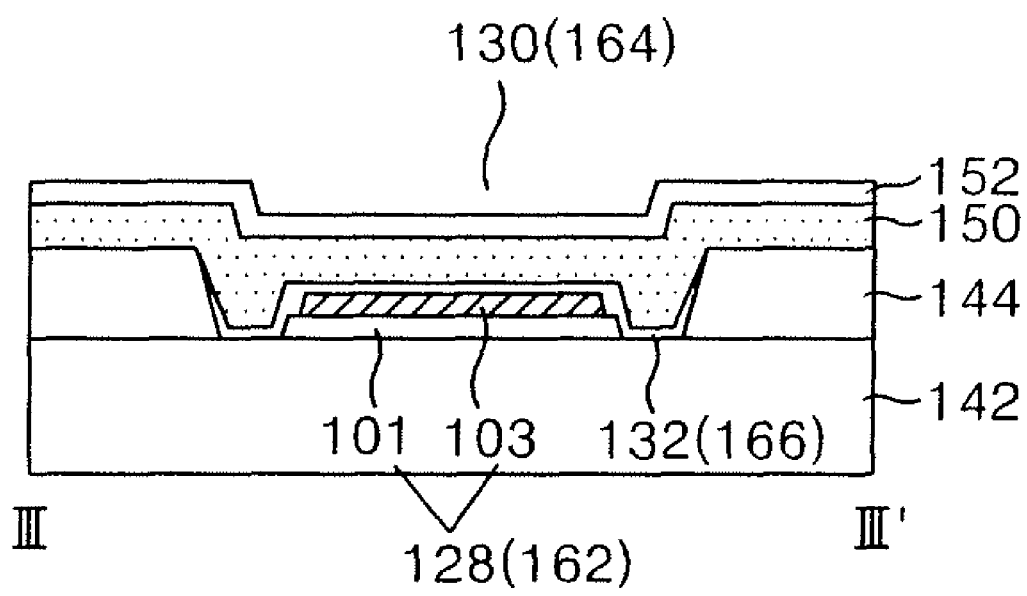
Figure 17C:
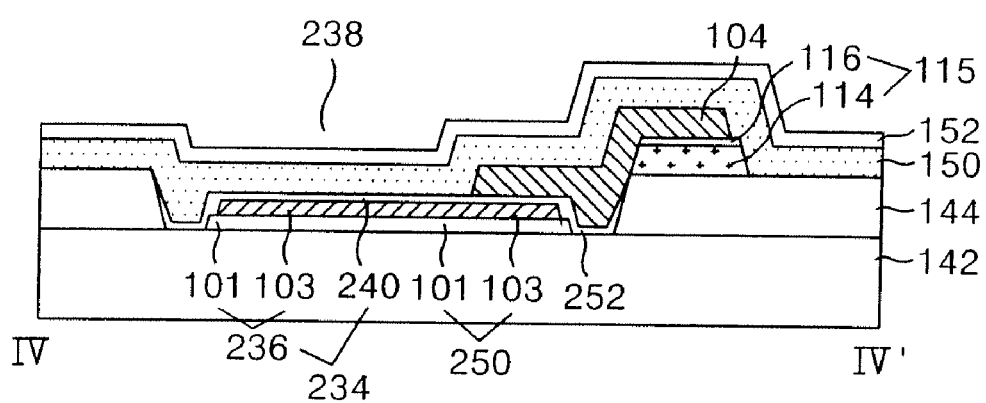
Figure 17D:
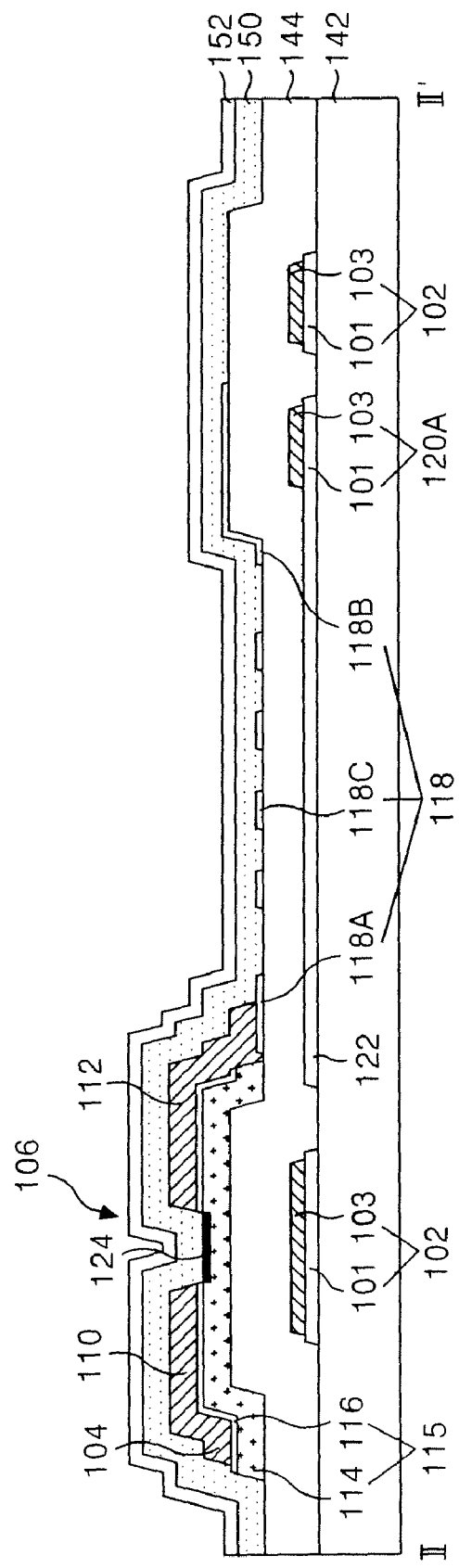
Figure 17E:
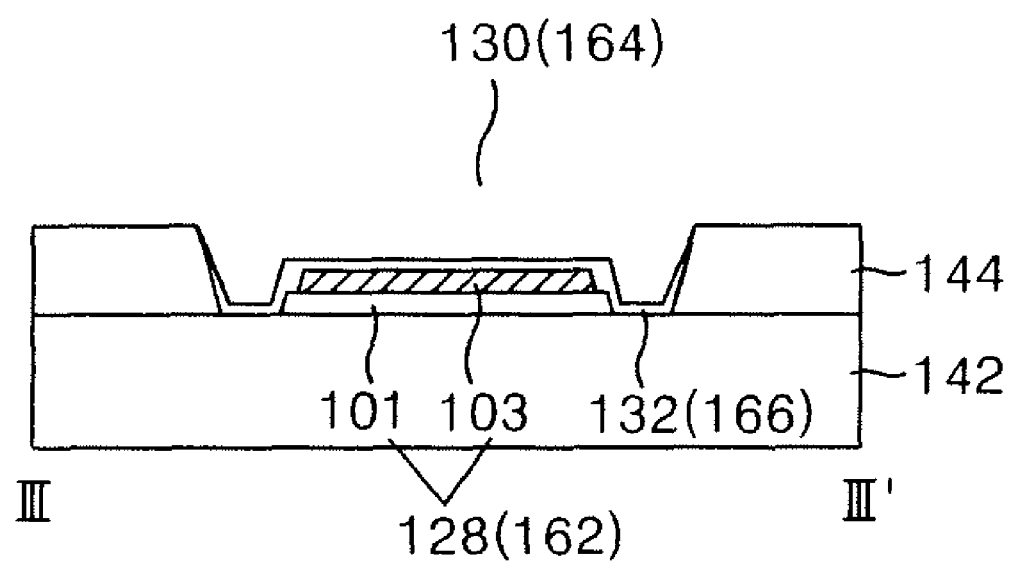
Figure 17F:
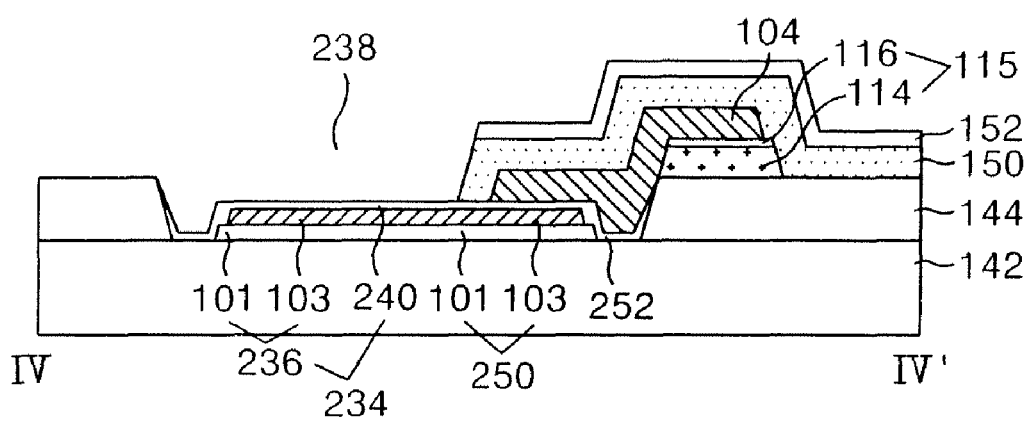

Alternatively, the protective film 150 may be opened at the pad area by an etching process using the alignment film provided thereon. For example, as illustrated in FIG. 17A, the protective film 150 is entirely formed on the substrate 142, and the alignment film 152 is formed on the protective film 150 by the rubber stamp printing method. Subsequently, as illustrated in FIG. 17D, the protective film 150 is opened at the pad area by the etching process using the alignment film 152 as a mask.

Figure 18A:
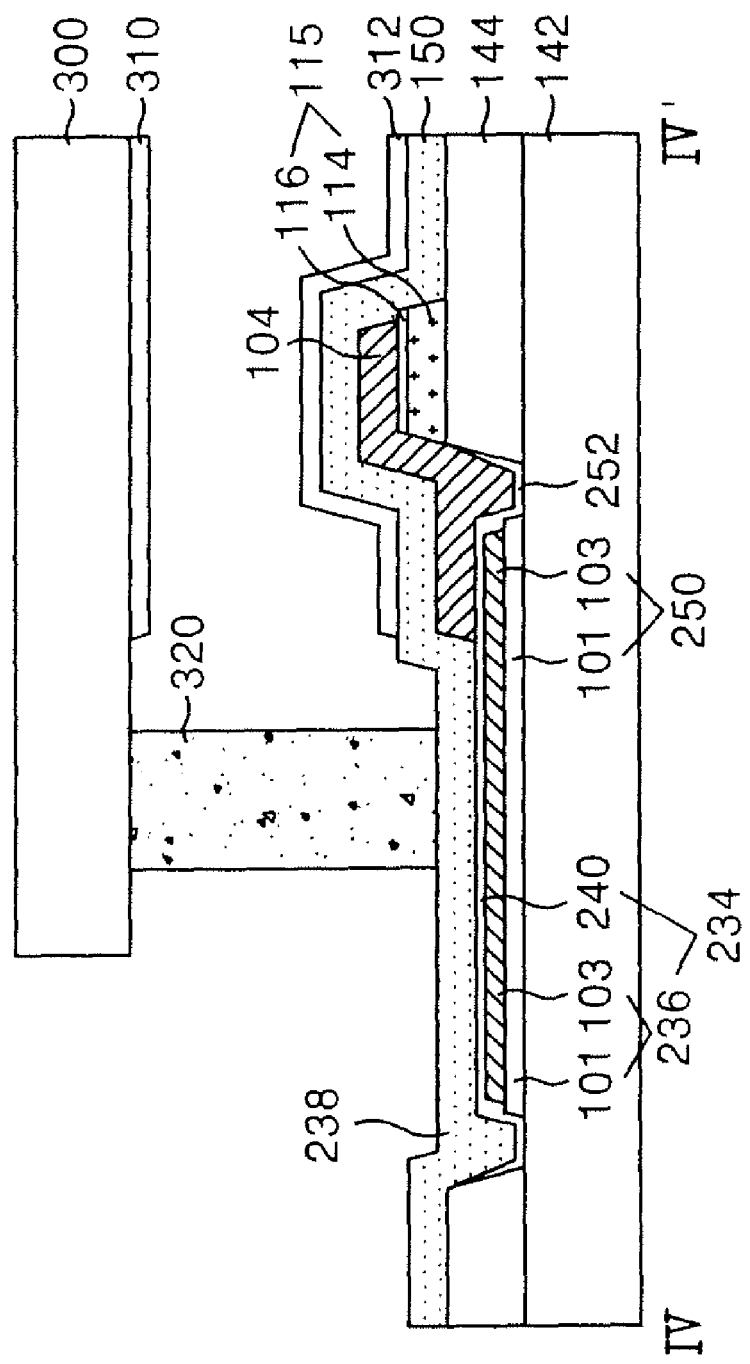
FIGS. 18A and 18B are sectional views illustrating a fabricating method of the protective film in a method of fabricating the liquid crystal display panel employing the thin film transistor substrate of fringe field switching type according to an embodiment of the present invention.
Figure 18B:
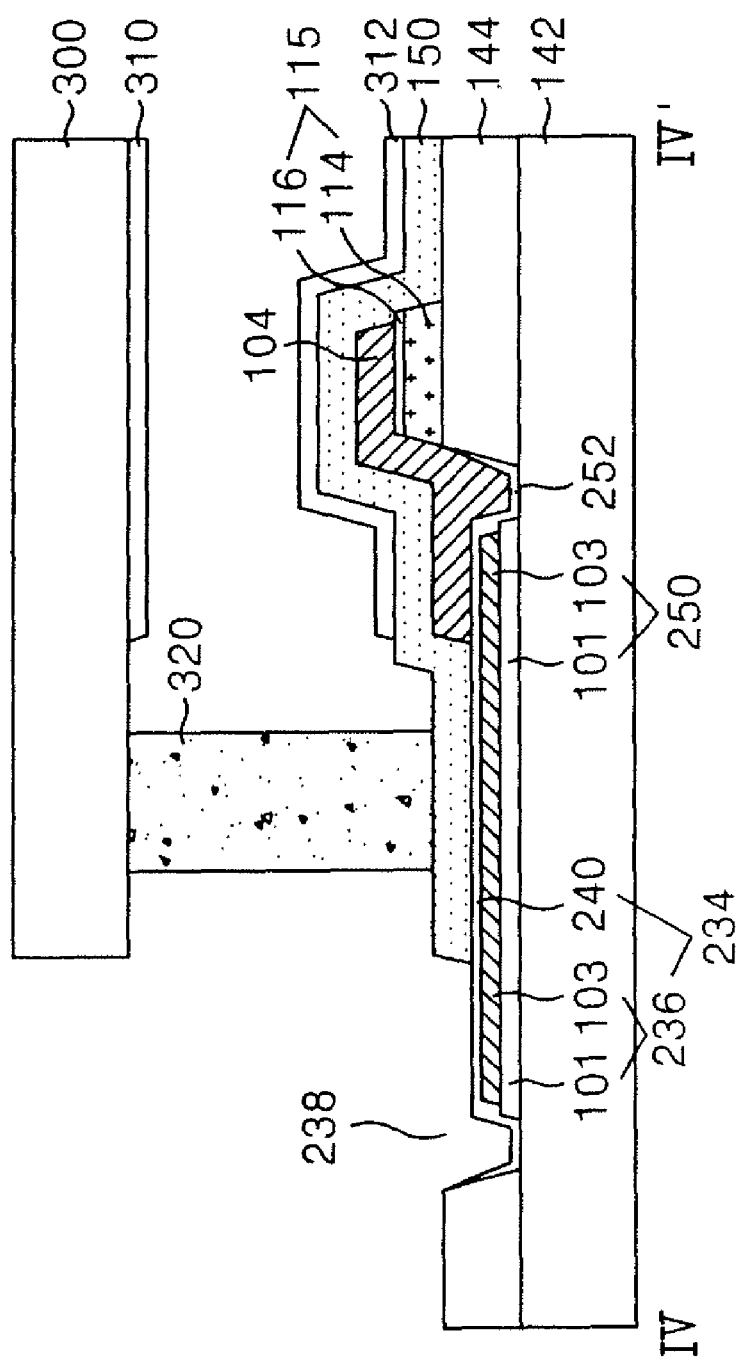

Further, the protective film 150 may be opened at the pad area by the etching process using the color filter substrate as a mask. For example, as illustrated in FIG. 18A, the thin film transistor substrate provided with the protective film 150 and having the lower alignment film 312 provided on thereon is joined to the color filter substrate 300 provided with the upper alignment film 310 by the sealant 320. Next, as illustrated in FIG. 18B, the protective film 150 is opened at the pad area by the etching process using the color filter substrate 300 as a mask. In this case, the protective film 150 may be opened at the pad area by the etching process using the plasma, or may be opened at the pad area by a dipping technique of dipping the liquid crystal display panel in which the thin film transistor substrate is joined to the color filter substrate 300 into an etching vessel filled with an etchant.

As described above, according to the present invention, a single-layer common electrode structure of is formed, along with a multiple-layer first mask pattern group, with the aid of the first partial transmitting mask.

Furthermore, according to the present invention, the semiconductor layer and the gate insulating film are simultaneously patterned by a single of mask process using the second partial transmitting mask to provide a plurality of holes having a different depth and to provide the transparent conductive pattern within the plurality of holes by a lift-off process of the photo-resist pattern used in the mask process.

Moreover, according to the present invention, the semiconductor layer patterned simultaneously with the gate insulating film is again patterned upon formation of the source/drain metal pattern to remove the exposed portion thereof, and the active layer between the source electrode and the drain electrode is exposed to define the channel of the thin film transistor. Thus, the semiconductor layer substantially exists only in the channel of the thin film transistor and the overlapping portion between the source/drain metal pattern and the gate insulating film.

In addition, according to the present invention, the protective film having an opened pad area is further provided by the printing technique, the fourth mask process, the etching process using the alignment film as a mask, or the etching process using the color filter substrate as a mask, etc.

Accordingly, the method of fabricating the FFS-type thin film transistor according to the present invention can be simplified by the three-round mask process, or the four-round mask process so that it becomes possible to reduce the material cost and the equipment investment cost, etc. as well as to improve the productivity.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
first and second substrates;
a gate line on the first substrate;
a common line on the first substrate;
a common electrode on the first substrate, wherein the common electrode is connected to the common line;
a gate insulating film on the gate line, the common line, and the common electrode;
a data line on the gate insulating film, wherein the data line crosses the gate line;
a thin film transistor having a gate electrode connected to the gate line, a source electrode connected to the data line, a drain electrode, and a semiconductor layer having a channel between the source electrode and the drain electrode;
a data pad having a transparent conductive layer in a contact hole passing through the gate insulating film, wherein the data line is extended to overlap with a portion of the contact hole and connected to the data pad by directly contacting on a portion of the data pad, and wherein the data pad forms an interface with the gate insulating film enclosing the contact hole; and
a pixel electrode formed directly on the gate insulating film connected to the drain electrode,
wherein one side of pixel electrode is aligned with one side of the semiconductor layer, and
wherein the drain electrode directly overlaps and directly contacts on a portion of the pixel electrode where the one side of the semiconductor layer and the one side of the pixel electrode are aligned.

2. The device of claim 1, wherein the common line includes:
a first layer having a transparent conductive material; and
a second layer having a metal.

3. The device of claim 2, wherein the first layer includes ITO.

4. The device of claim 2, wherein the second layer includes Mo.

5. The device of claim 2, wherein the common electrode is formed by an extension of the transparent conductive material of the common line.

6. The device of claim 1, wherein the pixel electrode overlaps the common electrode.

7. The device of claim 1, further comprising a gate pad connected to the gate line, wherein the gate pad includes:
a lower pad electrode on the first substrate; and
an upper pad electrode in a contact hole passing through the gate insulating film to expose the lower pad electrode, wherein the upper pad electrode is connected to the lower pad electrode.

8. The device of claim 1,
wherein the data pad further includes:
a lower pad electrode provided on the first substrate; and
an upper pad electrode in a contact hole passing through the gate insulating film to expose the lower pad electrode, wherein the upper pad electrode is connected to the lower pad electrode.

9. The device of claim 8, further comprising:
a data link extended from the lower pad electrode, wherein the data link overlaps the data line; and
a contact electrode in a second contact hole passing through the gate insulating film to expose the data link, wherein the contact electrode connects the data link to the data line.

10. The device of claim 1, wherein the channel between the source electrode and the drain electrode includes an oxidized surface.

11. The thin film transistor substrate of claim 1, further comprising a protective film on the first substrate.

12. The thin film transistor substrate of claim 11, further comprising an alignment film on the protective film.

* * * * *